United States Patent
Faulkner et al.

(10) Patent No.: US 11,567,785 B2
(45) Date of Patent: Jan. 31, 2023

(54) INTEGRATED MULTITASKING INTERFACE FOR COMMUNICATION SESSIONS

(71) Applicant: Microsoft Technology Licensing, LLC, Redmond, WA (US)

(72) Inventors: Jason Thomas Faulkner, Seattle, WA (US); Casey Baker, Seattle, WA (US); Ewin Davis Kannuthottiyil, Prague (CZ); Michael Hill, Shoreline, WA (US); Kevin Morrison, Arlington, MA (US); Ruchir Astavans, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/478,239

(22) Filed: Apr. 3, 2017

(65) Prior Publication Data
US 2018/0121214 A1 May 3, 2018

Related U.S. Application Data

(60) Provisional application No. 62/415,389, filed on Oct. 31, 2016.

(51) Int. Cl.
*G06F 3/0482* (2013.01)
*G06F 3/04842* (2022.01)
(Continued)

(52) U.S. Cl.
CPC ............ *G06F 9/451* (2018.02); *G06F 3/0482* (2013.01); *G06F 3/0486* (2013.01);
(Continued)

(58) Field of Classification Search
CPC ........ G06F 9/451; G06F 8/38; G06F 3/04883; G06F 3/0482; G06F 3/04842; G06F 3/0486; H04N 7/147; H04N 7/15; H03L 12/1822
See application file for complete search history.

(56) References Cited

U.S. PATENT DOCUMENTS

| | | |
|---|---|---|
| 6,025,871 A | 2/2000 | Kantor et al. |
| 6,608,637 B1 | 8/2003 | Beaton et al. |

(Continued)

FOREIGN PATENT DOCUMENTS

| | | |
|---|---|---|
| CN | 101005392 A | 7/2007 |
| CN | 102341822 A | 2/2012 |

(Continued)

OTHER PUBLICATIONS

"International Search Report and Written Opinion Issued in PCT Application No. PCT/US2017/057939", dated Jan. 12, 2018, 12 Pages.

(Continued)

*Primary Examiner* — Justin R. Blaufeld
(74) *Attorney, Agent, or Firm* — Scott Y. Shigeta; Newport IP, LLC

(57) ABSTRACT

The techniques disclosed herein enable participants of a teleconference session to access the functionality of a number of task-related program modules while maintaining engagement with aspects of a teleconference session within a single user interface. For example, a session participant can access files, various chat discussions, various channels, calendars, emails, an operating system desktop, and other functionality of a computing device while viewing one or more video streams of a teleconference session within a unified graphical user interface. The session participant can maintain engagement with both audio and video capabilities while performing tasks, including but not limited to, select- (Continued)

ing, viewing, and modifying content data. In some configurations, a specialized graphical user interface allows a user to view one or more video streams of the teleconference session in predetermined positions while also providing optimal access to tools for interacting with different types of content managed by a variety of modules.

18 Claims, 24 Drawing Sheets

(51) Int. Cl.
*G06F 3/0486* (2013.01)
*G06F 3/04883* (2022.01)
*G06F 9/451* (2018.01)
*H04L 12/18* (2006.01)
*H04L 65/401* (2022.01)
*H04N 7/14* (2006.01)
*H04N 7/15* (2006.01)

(52) U.S. Cl.
CPC ...... *G06F 3/04842* (2013.01); *G06F 3/04883* (2013.01); *H04L 12/1822* (2013.01); *H04L 65/4015* (2013.01); *H04N 7/147* (2013.01); *H04N 7/15* (2013.01)

(56) References Cited

U.S. PATENT DOCUMENTS

| | | | |
|---|---|---|---|
| 7,620,901 | B2 | 11/2009 | Carpenter et al. |
| 8,832,587 | B2 | 9/2014 | Abramson et al. |
| 2005/0099492 | A1* | 5/2005 | Orr ........................ H04N 7/147 348/E7.083 |
| 2007/0011231 | A1 | 1/2007 | Manion et al. |
| 2007/0118662 | A1 | 5/2007 | Vishwanathan et al. |
| 2008/0034085 | A1* | 2/2008 | Chawla ................. H04L 67/535 709/224 |
| 2011/0271210 | A1* | 11/2011 | Jones .................... H04L 67/306 715/753 |
| 2012/0062688 | A1* | 3/2012 | Shen ................... G06F 3/04886 348/E7.083 |
| 2012/0317483 | A1 | 12/2012 | Shapiro et al. |
| 2014/0184723 | A1* | 7/2014 | Morrison .............. H04L 65/756 348/14.07 |
| 2014/0195885 | A1 | 7/2014 | Thiruvidam et al. |
| 2014/0198173 | A1* | 7/2014 | Willig .................... H04N 7/155 348/14.06 |
| 2014/0267560 | A1* | 9/2014 | Bright-Thomas ...... H04N 19/88 348/14.08 |
| 2015/0049162 | A1* | 2/2015 | Kurupacheril ..... H04N 5/23238 348/14.08 |
| 2015/0077502 | A1 | 3/2015 | Jordan et al. |
| 2015/0103131 | A1* | 4/2015 | Denoue .................... H04N 7/15 348/14.03 |
| 2015/0134737 | A1 | 5/2015 | Albrecht |
| 2015/0295777 | A1* | 10/2015 | Cholkar .............. G06F 3/04842 715/753 |
| 2016/0014059 | A1 | 1/2016 | Rathod |
| 2016/0231888 | A1* | 8/2016 | Govindraj ........... G06F 3/04847 |
| 2016/0308920 | A1* | 10/2016 | Brunsch ................ H04L 67/141 |
| 2016/0323333 | A1* | 11/2016 | Aggarwal ........... H04L 65/4038 |
| 2016/0349965 | A1* | 12/2016 | Griffin .................. H04L 65/403 |
| 2018/0011627 | A1* | 1/2018 | Siracusano, Jr. ... G06F 3/04845 |
| 2018/0070008 | A1* | 3/2018 | Tyagi ................. H04N 5/23219 |

FOREIGN PATENT DOCUMENTS

| | | |
|---|---|---|
| CN | 102930014 A | 2/2013 |
| CN | 105427087 A | 3/2016 |
| EP | 2930906 A1 | 10/2015 |

OTHER PUBLICATIONS

Aguilar, Nelson, "How to Get a Floating Video Window While Multitasking on Your iPad in iOS 9", http://ios.wonderhowto.com/how-to/get-floating-video-window-while-multitasking-your-ipad-ios-9-0162457/, Retrieved on: Oct. 14, 2016, 11 pages.

Sawers Paul, "Skype for Android now lets you hold video calls while multitasking on your phone", http://thenextweb.com/apps/2014/11/26/skype-android-now-lets-hold-video-calls-multitasking-phone/, Published on Nov. 26, 2014, 7 pages.

"FloatIRC Beta—Floating Chat", http://web.archive.org/web/20121221074553/https7play.google.com/store/apps/details?id=com.jdbye.floatircbeta, Published on: Dec. 21, 2012, 3 pages.

Hoffman, Chris, "Get Real Multitasking on Android With These 8 Floating Apps", http://www.howtogeek.com/130924/get-real-multitasking-on-android-with-these-8-floating-apps/, Published on: Dec. 13, 2012, 5 pages.

"Office Action Issued in European Patent Application No. 17794861.9", dated Apr. 9, 2020, 4 Pages.

"First Office Action and Search Report Issued in Chinese Patent Application No. 201780067084.2", dated Nov. 20, 2020, 14 Pages.

"Second Office Action Issued in Chinese Patent Application No. 201780067084.2", dated May 28, 2021, 9 Pages.

"Office Action Issued in Chinese Patent Application No. 201780067084.2", dated Sep. 22, 2021, 9 Pages.

"Notice of Allowance Issued in Chinese Patent Application No. 201780067084.2", dated Nov. 4, 2022, 8 Pages.

Qingheng, et al., "The Model of SIP Based Video Conference System", In Journal of Computer Engineering and Applications, Dec. 1, 2004, pp. 148-152.

* cited by examiner

INTEGRATED MULTITASKING INTERFACE FOR COMMUNICATION SESSIONS

CROSS REFERENCE TO RELATED APPLICATION

This patent application claims the benefit of U.S. Provisional Patent Application Ser. No. 62/415,389 filed Oct. 31, 2016, entitled "INTEGRATED MULTITASKING INTERFACE FOR TELECOMMUNICATION SESSIONS," which is hereby incorporated in its entirety by reference.

BACKGROUND

Communication and collaboration are key aspects in people's lives, both socially and in business. Communication and collaboration tools have been developed with the aim of connecting people to share experiences. In many cases, the aim of these tools is to provide, over a network, an experience which mirrors real life interaction between individuals and groups of people. Interaction is typically provided by audio and/or visual elements.

Such tools include instant messaging, voice calls, video calls, group chat, shared desktop, shared media and content, shared applications, etc. Such tools can perform capture, manipulation, transmission and reproduction of audio and visual elements, and use various combinations of such elements in an attempt to provide a collaborative environment. A user can access such tools to create a teleconference session with multiple users by the use of a laptop or desktop computer, mobile phone, tablet, games console, etc. Such devices can be linked in a variety of possible network architectures, such as peer-to-peer architectures or client-server architectures or a hybrid, such as a centrally managed peer-to-peer architecture.

Some current teleconference technologies can leave much to be desired. For example, in some existing programs, when participants of a teleconference session desire to interact with certain types of content, such as a document or spreadsheet, users often need to open a separate window or a completely different program. This issue also exists when users wish to conduct a private chat session with certain users, particularly when they wish to engage in a private chat session with users that are not participants of a teleconference session. In any arrangement where a user is required to switch to a different window or a completely different program to conduct a task, a participant's attention is diverted from the contents of the teleconference session. While a user is engaged with other user interfaces or other programs, important subject matter communicated in the session may be missed or overlooked. Even worse, such distractions of one participant can reduce the overall engagement of all session participants.

It is with respect to these and other considerations that the disclosure made herein is presented.

SUMMARY

The techniques disclosed herein enable participants of a teleconference session to access the functionality of a number of task-related program modules while maintaining engagement with aspects of a teleconference session within a single user interface. For example, a session participant can access files, various chat discussions, various channels, calendars, emails, an operating system desktop, and other functionality of a computing device while viewing one or more video streams of a teleconference session within a unified graphical user interface. The session participant can maintain engagement with both audio and video capabilities while performing tasks, including but not limited to, selecting, viewing, and modifying content data. In some configurations, a specialized graphical user interface allows a user to view one or more video streams of the teleconference session in predetermined positions while also providing optimal access to tools for interacting with different types of content managed by a variety of modules. Enabling a participant of a teleconference session to access tools for selecting, viewing, and modifying various forms of content while simultaneously viewing video streams of the teleconference session keeps the participants engaged in the session while enabling users to multitask. In some embodiments, select streams showing salient features of a teleconference session are displayed while a user is multitasking with other programs. Such features, as will be described in more detail below, increase a user's productivity and the overall efficiency of human interaction with a computing device.

In one illustrative example, a video stream of a teleconference session, such as a video stream of multiple participants, can be displayed in a graphical user interface. One participant can select a file, such as a PowerPoint file, and independently view the contents of the selected file while staying engaged with the displayed video stream of the teleconference session. Thus, even when a presenter of the teleconference session is displaying a particular slide of the PowerPoint file, other participants can browse through other sides, and even possibly edit the file, during the presentation. In addition, the participant can engage with multiple message forums, e.g., a channel forum or a chat forum, while staying engaged with the video streams of a teleconference session. By the use of the techniques disclosed herein, a user can independently navigate through the contents of a message forum while viewing a video stream of a presenter or material shared by the presenter.

In some configurations, a graphical user interface provides functionality to enable participants of a teleconference session to drag-and-drop events, documents or other objects into a teleconference session. For instance, a user can view objects displayed in a chat window, such as a word document, and that document can be dragged and dropped into a graphical element displaying one or more video streams of the teleconference session. In response, the contents of the word document can be shared with other participants of the teleconference session.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
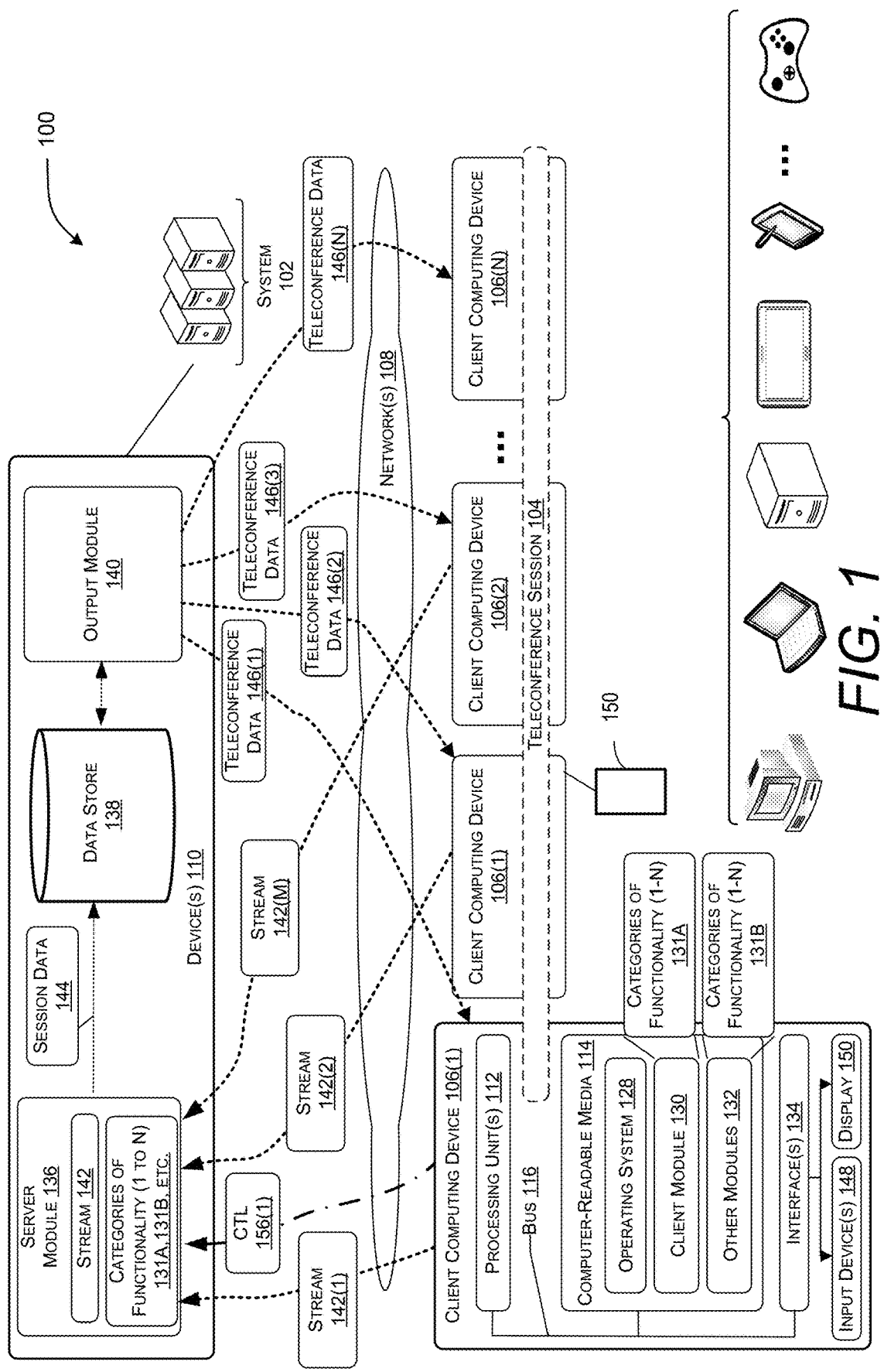
FIG. 1 is a block diagram of an example of a teleconference system.

The techniques disclosed herein enable participants of a teleconference session to access the functionality of a number of task-related program modules while maintaining engagement with aspects of a teleconference session within a single user interface. For example, a session participant can access files, various chat discussions, various channels, calendars, emails, an operating system desktop, and other functionality of a computing device while viewing one or more video streams of a teleconference session within a unified graphical user interface. The session participant can maintain engagement with both audio and video capabilities while performing tasks, including but not limited to, selecting, viewing, and modifying content data. In some configurations, a specialized graphical user interface allows a user to view one or more video streams of the teleconference session in predetermined positions while also providing optimal access to tools for interacting with different types of content managed by a variety of modules. Enabling a participant of a teleconference session to access tools for selecting, viewing, and modifying various forms of content while simultaneously viewing video streams of the teleconference session keeps the participants engaged in the session while enabling users to multitask. Such features, as will be described in more detail below, increase a user's productivity and the overall efficiency of human interaction with a computing device.

In one illustrative example, a video stream of a teleconference session, such as a video stream of multiple participants, can be displayed in a graphical user interface. One participant can select a file, such as a PowerPoint file, and independently view the contents of the selected file while staying engaged with the displayed video stream of the teleconference session. Thus, even when a presenter of the teleconference session is displaying a particular slide of the PowerPoint file, other participants can browse through other sides, and even possibly edit the file, during the presentation. In addition, the participant can engage with multiple message forums, e.g., a channel forum or a chat forum, while staying engaged with the video streams of a teleconference session. By the use of the techniques disclosed herein, a user can independently navigate through the contents of a message forum while viewing a video stream of a presenter or material shared by the presenter.

In some configurations, a graphical user interface provides functionality to enable participants of a teleconference session to drag-and-drop events, documents or other objects into a teleconference session. For instance, a user can view objects displayed in a chat window, such as a word document, and that document can be dragged and dropped into a graphical element displaying one or more video streams of the teleconference session. In response, the contents of the word document can be shared with other participants of the teleconference session.

The client computing devices may be configured to allow a user to multi-task while also staying engaged with the teleconference session. In an example implementation, the teleconference session involves participant streams from client computing devices used by the participants. The participant streams include video, audio, or image data that identify or represent the participants in a display of the teleconference session at the client computing devices. The teleconference session may also receive content streams from one or more client computing devices, or from another source. The content streams include streams that are not participant streams. In some configurations, the content streams include video or image data of files, data structures, word processing documents, formatted documents (e.g. PDF documents), spreadsheets, or presentations to be presented to, and thereby shared with, the participants in the display of the teleconference session. The teleconference session at the server combines the streams to generate teleconference data and transmits the teleconference data to each client computing device according to a teleconference session view configured for each client computing device.

The teleconference session view may be tailored for each client computing device using one of several different views. As discussed briefly above, for a given client computing device, the teleconference session view may be in a first user interface having a display area referred to herein as a stage view, or a second user interface having a display area referred to herein as a teleconference monitor view. According to some configurations, the stage view provides a total display experience in which either people or content is viewed "on stage," which is a primary display area of an interface. In some configurations, the primary display area of a user interface can be displayed in a manner that dominates the display on a user's client computing device. The stage view allows a user to be fully immersed with the content being shared among the teleconference participants. User interface elements associated with the stage view can be used to display streams that correspond to participants and the content that is not being displayed on stage and/or otherwise control operations relating to the display of the stage view.

In some implementations, the stage view may be displayed in one of two display modes. A first display mode is a "windowed mode," which includes a frame around the primary display area, wherein the frame comprises user interface control elements for controlling aspects of the windows, such as minimizing, maximizing, or closing the user interface. The stage view may also be displayed in an "immersive mode," which does not include a frame. In the immersive mode, the primary display area can occupy the entire display area of a device.

In the stage view, the content or participants are displayed in the primary display area that occupies at least a majority of the display area. The stage view may be changed to a multi-tasking view as a result of the user "multi-tasking" by accessing a category of functionality that is outside of the teleconference session. For example, when the user decides to open a Web browser, the system causes a display of a second user interface, e.g., a multi-tasking view, to display content accessed by the Web browser. The system can also cause a display of a teleconference monitor view within the second user interface to display one or more streams of the teleconference session. In some configurations, the teleconference monitor view is a display of one or more thumbnail sized, e.g., reduced size, user interface elements that are configured to display renderings of at least a portion of one or more of the streams. For example, a thumbnail can be configured to display a rendering of the active speaker and/or the presented content currently being displayed within the teleconference session. The teleconference monitor view can be displayed such that the user stays engaged with the teleconference session while also interacting with different categories of functionality outside of the teleconference session. According to some examples, the location of the teleconference monitor view can be based on the selected category of functionality, and in some cases, the location of the teleconference monitor view can be based on a graphical analysis of the content associated with the selected category of functionality that is rendered on the display.

User interface elements can be provided to allow the user to switch between different arrangements. In example implementations as described below, the user interface elements allow the user to switch between the stage view and the multi-tasking views. Other views in addition to the stage view and the multi-tasking view may be provided. The user may be provided with tools to switch between the views to alter the user's experience of the teleconference session. For illustrative purposes, the terms "user" and "participant" are used interchangeably and in some scenarios the terms have the same meaning. In some scenarios, a user is associated with and interacting with a computer. A participant, for example, can be a user of a computer both viewing and providing input to a teleconference session.

In FIG. 1, a diagram illustrating an example of a teleconference system 100 is shown in which a system 102 can control the display of monitor views for a teleconference session 104 in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110, and the device(s) 110 and/or other components of the system 102 may include distributed computing resources that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities having products such as SLACK®, WEBEX®, GOTOMEETING®, GOOGLE HANGOUTS®, SKYPE FOR BUSINESS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Example networks support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phones, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a teleconference device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses. The computer-readable media 114 may store executable instructions and data used by programmed functions during operation. Examples of functions implemented by executable instructions stored on the computer-readable media 114 may include, for example, an operating system 128, a client module 130, other modules 132, and, programs or applications that are loadable and executable by processing units(s) 112.

Client computing device(s) 106(1) through 106(N) may also include one or more interface(s) 134 to enable communications with other input devices 148 such as network interfaces, cameras, keyboards, touch screens, and pointing devices (mouse). For example, the interface(s) 134 enable communications between client computing device(s) 106(1) through 106(N) and other networked devices, such as device(s) 110 and/or devices of the system 102, over network(s) 108. Such network interface(s) 134 may include one or more network interface controllers (NICs) (not shown) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 with the other client computing devices 106(2) through 106(N) over the network 108.

The client module 130 of each client computing device 106(1) through 106(N) may include logic that detects user input and communicates control signals to the server to request a first category of functionality relating to controlling aspects of the teleconference session 104, as well as requesting the server to request one or more other categories of functionality that can be provided by the system 102. For example, the client module 130 in the first client computing device 106(1) in FIG. 1 may detect a user input at an input device 148. The user input may be received, for example, as a finger press on a user interface element displayed on a touchscreen, a click of a mouse on a user interface element selected by a pointer on the display 150, or even a voice command. The client module 130 translates the user input according to a function associated with the selected user interface element. The client module 130 may send a control signal 156(1) (also referred to herein as a "control command" or an "indication") to a server (for example, a server operating on the device 110) to perform the desired function. In some examples, the client module 130 may send a control signal to a server indicating that the user has selected to perform a task using a different program, such as provided by one of the other modules 132.

In one example, the user of the client computing device 106(1) may wish to multi-task during the teleconference session 104. For instance, a user may desire to interact with a second category of functionality that is not part of the first category of functionality that is associated with a display of the stage view of teleconference session 104 (e.g., accessing a web browser, a productivity application, a photo application, an entertainment application, and the like). As an example, the user may interact with functionality provided by the other modules 132 and/or interact with functionality provided by a different service during the teleconference session 104. Using techniques described herein, the user of the client computing device 106(1) can continue to stay engaged with participants, other users and content of the teleconference session 104 while multi-tasking inside and outside of the teleconference application.

As illustrated, the client module 130 can be associated with categories of functionality 131A and the other modules can be associated with categories of functionality 131B. The client module can be used to access one or more categories that are provided by the teleconference system 102 via the server module 136. In some configurations, the client module 130 can be configured to provide one or more of the categories of functionality 131A.

As discussed above, the teleconference service may provide users with many different tools that are associated with different categories of functionality 131A. For example, the teleconference service may provide a first category of functionality that is associated with managing a teleconference session, a second category of functionality that is associated with electronic messaging, a third category of functionality that is associated with document viewing and/or editing, a fourth category of functionality that is associated with managing a calendar, a fifth category of functionality that is associated with a chat service, and the like.

During a teleconference session 104, the user can also access the different categories of functionality 131B that are associated with other applications and/or services. For example, a user might access a category of functionality that is associated with a Web browser, an email application, a mapping service, a music application, a video application, and the like. Generally, the other modules 132 can be any type of application or service accessible by the client computing device 106(1).

Enabling users of a teleconference session to access different categories of functionality (e.g., tools for selecting, viewing, and modifying various forms of content) while simultaneously viewing one or more streams of the teleconference session keeps them engaged in the session while enabling multi-tasking.

In some examples, when the user is navigating other functionality provided by the teleconference system or accessing other functionality provided by a different application, at least a portion of the one or more streams can be rendered within a teleconference monitor view that is displayed within or concurrently with a multi-tasking view. For example, the teleconference monitor view can be displayed within a user interface element that is associated with the other category of functionality. In one illustrative example, the teleconference monitor view rendering a video stream of a participant can be displayed within a display area rendering chat messages when the user is accessing the category of functionality associated with the chat program.

According to some examples, the location of where to render the teleconference monitor view can be based on a selected category of functionality. In some configurations, the server module 136 of the teleconference service can position the teleconference monitor view on the display 150 based on knowledge of the locations of the displayed user interface elements and content within the user interfaces associated with the selected category of functionality. For example, when the user selects chat functionality that is provided by the category of functionality 131A, the teleconference monitor view may be placed within an area of the menu bar that does not include other content. Similarly, when the user selects contact functionality such as an address book that is provided by the category of functionality 131A, the teleconference monitor view can be placed in a predetermined position that does not obscure the address information, phone controls, and the like. In some configurations, a default location can be associated with each of the different categories of functionality.

In other examples, the location of the teleconference monitor view can be based on an analysis of the content that is displayed as a result of the user selecting the category of functionality. According to some techniques, the teleconference system performs an analysis of graphical data rendered on the display 150 to identify areas on the display that do not include selectable user interface elements (e.g., control buttons, selectors, scroll bars, and the like) or areas of the display that do not include other types of content that the user may want to view (e.g., text, drawings, graphs). For instance, when the user selects functionality from the categories of functionality 131B, the server module 136 can obtain a screenshot of the display 150 and perform an edge detection mechanism, a histogram, or some other technique to identify areas on the display 150 that include selectable user interface elements as well as identify areas on the display that include other graphical content. When an area is identified to not include user interface controls and/or other content, the server module 136, and or the client module 130, or some other component, can determine the location on the display at which to render the teleconference monitor view.

As discussed above, the teleconference session views can include a stage view that includes a display area for participants and content. In some examples, the stage view is displayed when the user is not multi-tasking. When the user decides to multi-task, and causes a different user interface to be displayed, e.g., accessing another application or accessing functionality provided by the teleconference system 102, that can cause the stage view to be removed from the display and/or be hidden from view or at least partially obscured.

Instead of the user not being able to view content or people associated with the teleconference session 104 when the user navigates away from the stage view by selecting a different category of functionality, the teleconference system 102 presents the multi-tasking view with a teleconference monitor view (e.g., a thumbnail user interface element) that provides a rendering of at least one teleconference stream. For example, the teleconference monitor view can display the current presenter, and/or other content. In some instances, the teleconference monitor view includes a thumbnail view of the current presenter and/or content being presented. The size and position of the teleconference monitor view can be set based on predetermined settings, user preferences, and/or user positioning. According to some configurations, a portion of the teleconference monitor view displays a video stream of the user's camera view when the user is sharing a camera view. This video stream of the user's camera is based on a stream generated at the user's computing device; the rendering of this video stream is referred to herein as a "ME" view.

The stage view and the teleconference monitor view can also include graphical elements providing control functionality ("control elements") for a teleconference session. For instance, a graphical element may be generated on the user interface enabling a user to enter an input to share content, end a session, mute one or more sounds, return to the stage view, and the like.

In response to the user navigating away from the stage view (that provides a more immersive teleconference experience for the user) on the display 150, the system 102 detects the change (e.g., via the CTL 156(1) signal) and causes the teleconference monitor view to be presented on the display 150. According to some techniques, the client module 130 may identify the selection of a user interface element as a request to exit the stage view, but not exit the program managing the teleconference session. In response to detecting the request, the client module 130 sends a control signal 156(1) to a teleconference session host to perform the view switching function that causes the teleconference monitor view to be presented along with the multi-tasking view within the display 150. In other examples, the client module 130, or some other component or module, provides an indication to the teleconference host that the user has changed views and is accessing a different category of functionality. Upon receiving the indication to switch views, the server module 136 can determine the location on the display 150 where to render the teleconference monitor view, generate the teleconference stream associated with the teleconference monitor view, and cause the teleconference stream to be rendered on the display 150.

The client computing device(s) 106(1)-106(N) may use their respective client modules 130, other modules 132, or some other module (not shown) to generate participant profiles, and provide the participant profiles to other client computing devices (not shown) and/or to the device(s) 110 of the system 102. A participant profile may include one or more of an identity of a participant (e.g., a name, a unique identifier ("ID"), etc.), participant data, such as personal data and location data which may be stored, etc. Participant profiles may be utilized to register participants for teleconference sessions.

As shown in FIG. 1, the device(s) 110 of the system 102 includes a server module 136, a data store 138, and an output module 140. The server module 136 is configured to receive, from individual client computing devices 106(1) through 106(N), streams 142(1) through 142(M) (where M is a positive integer number equal to 2 or greater). In some scenarios, not all the client computing devices utilized to participate in the teleconference session 104 provide an instance of streams 142, and thus, M (the number of instances submitted) may not be equal to N (the number of client computing devices). In some other scenarios, one or more of the client computing devices may be communicating an additional stream that includes content, such as a document or other similar type of media intended to be shared during the teleconference session.

The server module 136 is also configured to receive, generate and communicate session data 144 and to store the session data 144 in the data store 138. The session data 144 can define aspects of a teleconference session 104, such as the identities of the participants, the content that is shared, etc. In various examples, the server module 136 may select aspects of the streams 142 that are to be shared with the client computing devices 106(1) through 106(N). The server module 136 may combine the streams 142 to generate teleconference data 146(1) through 146(N) (teleconference data 146) defining aspects of the teleconference session 104. The teleconference data 146 can comprise individual streams containing select streams 142. The teleconference data 146 can define aspects of the teleconference session 104, such as a user interface arrangement of the user interfaces on the client computing devices, the type of data that is displayed and other functions of the server and client computing devices. The server module 136 may configure the teleconference data 146 for the individual client computing devices 106(1)-106(N).

Teleconference data can be divided into individual instances referenced as 146(1)-146(N). The output module 140 may communicate the teleconference data instances 146(1)-146(N) to the client computing devices 106(1) through 106(N). Specifically, in this example, the output module 140 communicates teleconference data instance 146(1) to client computing device 106(1), teleconference data instance 146(2) to client computing device 106(2), teleconference data instance 146(3) to client computing device 106(3), and teleconference data instance 146(N) to client computing device 106(N), respectively.

The teleconference data instances 146(1)-146(N) may communicate audio that may include video representative of the contribution of each participant in the teleconference session 104. Each teleconference data instance 146(1)-146(N) may also be configured in a manner that is unique to the needs of each participant/user of the client computing devices 106(1) through 106(N). Each client computing device 106(1)-106(N) may be associated with a teleconference session view. Examples of the use of teleconference session views to control the views for each user at the client computing devices are described with reference to FIG. 2.

Figure 2:
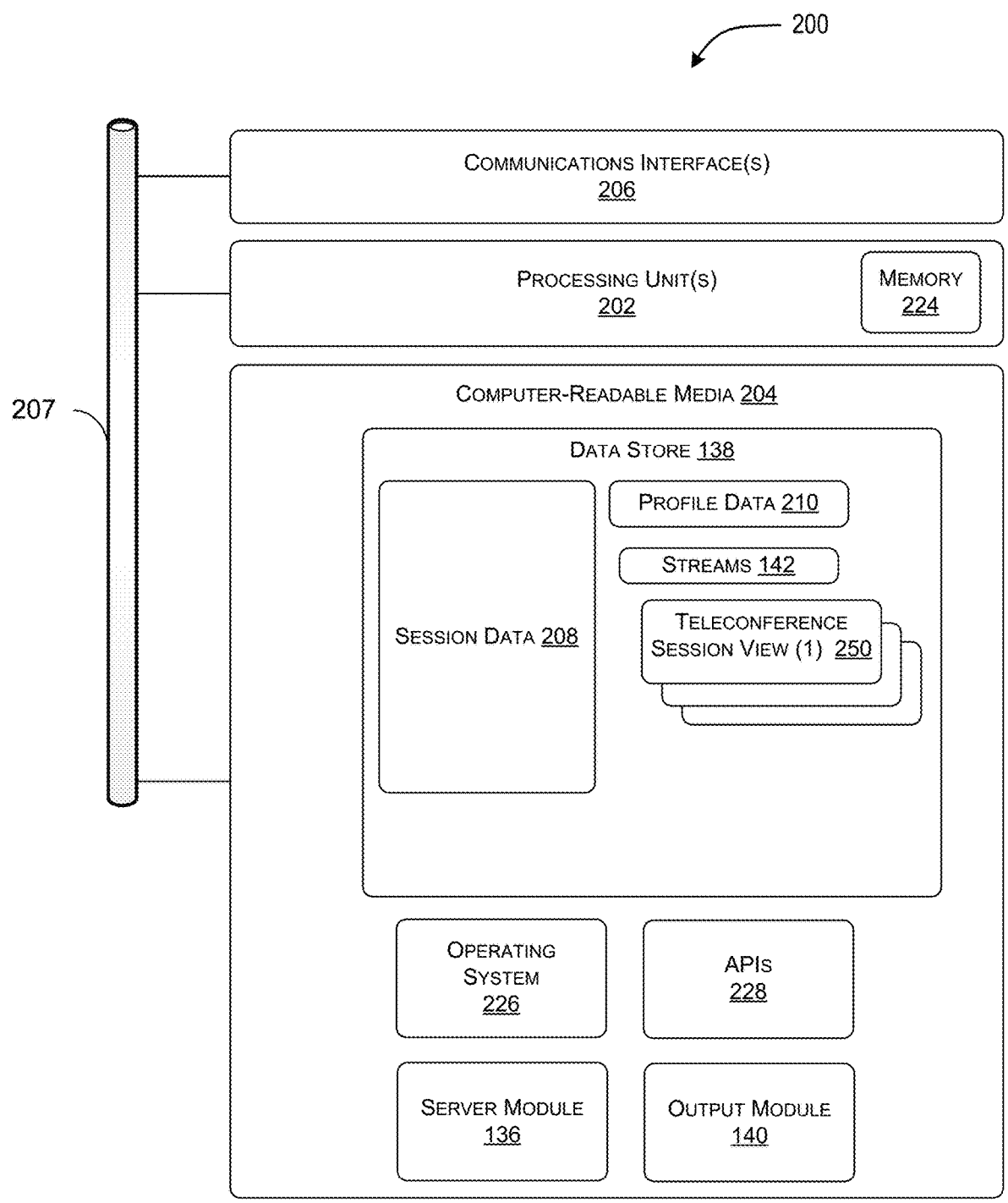
FIG. 2 is a block diagram of an example of the device in the teleconference system of FIG. 1.

In FIG. 2, a system block diagram is shown illustrating components of an example device 200 configured to provide the teleconference session 104 between the client computing devices, such as client computing devices 106(1)-106(N), the device 110 or the system 102 in accordance with an example implementation. The device 200 may represent one of device(s) 110 where the device 200 includes one or more processing unit(s) 202, computer-readable media 204, communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communications media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network. The communication interfaces 206 are used to communication over a data network with client computing devices 106.

In the illustrated example, computer-readable media 204 includes the data store 138. In some examples, the data store 138 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or executed by processing unit(s) 202 and/or accelerator(s). For instance, in some examples, the data store 138 may store session data 208 (e.g., session data 144), profile data 210, and/or other data. The session data 208 may include a total number of participants in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a participant identity ("ID") and other data.

In an example implementation, the data store 138 stores data related to the view each participant experiences on the display of the users' client computing devices 106. As shown in FIG. 2, the data store 138 may include a teleconference session view 250(1) through 250(N) corresponding to the display of each client computing device 106(1) through 106(N) participating in the teleconference session 104. In this manner, the system 102 may support individual control over the view each user experiences during the teleconference session 104. For example, as described in more detail below, the system 102 displays a stage view when the user is not accessing other functionality and displays a teleconference monitor view when the user is multi-tasking by accessing other functionality.

The teleconference monitor view on a user's display may be changed to keep the user engaged in the teleconference session even though the user is multi-tasking. For example, as the user is viewing other content associated with a selected category or functionality associated with content that is not part of the teleconference session, the system 102 can select a size and/or location of a rendering of a stream associated with the teleconference session that optimizes the display of the content associated with a selected category or functionality. Such embodiments enable a user to close a user interface of a teleconference session, and open another user interfaces, e.g., a Word Processor interface for viewing a document, a Calendar Program interface to edit a calendar, or another interface controlled by functionality to view other content, while automatically determining a size and location of the display of the stream of the teleconference session within each interface.

The teleconference session view 250(1)-250(N) may store data identifying the view being displayed for each client computing device 106(1)-106(N). The teleconference session view 250 may also store data relating to streams configured for display, the participants associated with the streams, whether content media is part of the display, and information relating to the content. Some teleconference sessions may involve a large number of participants. However, only a core number of the participants may be what can be referred to as "active participants." The teleconference session view for each user may be configured to focus on media provided by the most active participants. Some teleconference sessions may involve a presenter entity, such as in a seminar, or a presentation by one or more individual presenters. At any given time, one participant may be a presenter, and the presenter may occupy an enhanced role in a teleconference session. The presenter's role may be enhanced by maintaining a consistent presence on the user's display. Information relating to the presenter may be maintained in the teleconference session view 250.

As noted above, the data store 138 may store the profile data 210, streams 142, data defining teleconference session views 250, session data 208, and other data and modules described herein. Alternately, some or all of the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes an operating system 226 and an application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the system 102 is configured to host the teleconference session 104 with the plurality of client computing devices 106(1) through 106(N). The system 102 includes one or more processing units 202 and a computer-readable medium 204 having encoded thereon computer-executable instructions to cause the one or more processing units 202 to receive streams 142(1)-142(M) at the system 102 from a plurality of client computing devices 106(1)-106(N), select streams 142 based, at least in part, on the teleconference session view 250 for each user, and communicate teleconference data 146 defining the teleconference session views 250 corresponding to the client computing devices 106(1) through 106(N). The teleconference data instances 146(1)-146(N) are communicated from the system 102 to the plurality of client computing devices 106(1) through 106(N). The teleconference session views 250(1)-250(N) cause the plurality of client computing devices 106(1)-106(N) to display views of the teleconference session 104 under user control. The computer-executable instructions also cause the one or more processing units 202 to determine that the teleconference session 104 is to transition to a different teleconference session view of the teleconference session 104 based on a user communicated view switch control signal 156.

As discussed, the techniques disclosed herein may utilize one or more "views." In some examples, the views include the stage view (also referred to herein as "teleconference session views") and the teleconference monitor view. In an example of an operation, the system 102 performs a method that includes receiving the streams 142(1)-142(N) at the system 102 from a plurality of client computing devices 106(1)-106(N). The system combines and formats the streams 142 based, at least in part, on a selected teleconference session view for each client computing device to generate teleconference data 146, e.g., teleconference data instances 146(1)-146(N). The teleconference data instances 146(1)-146(N) are then communicated to the individual client computing devices 106(1)-106(N).

It is noted that the above description of the hosting of a teleconference session 104 by the system 102 implements the control of the teleconference session view in a server function of the device 110. In some implementations, the server function of the device 110 may combine all media portions into the teleconference data for each client computing device 106 to configure the view to display. The information stored in the teleconference session view as described above may also be stored in a data store of the client computing device. The client computing device may receive a user input and translate the user input as being a view switching control signal that is not transmitted to the server. The view switching control signal may be processed on the client computing device itself to cause the display to switch to the desired view. The client computing device 106 may change the display by re-organizing the portions of the teleconference data 146 received from the server according to the view selected by the user.

Figure 3A:
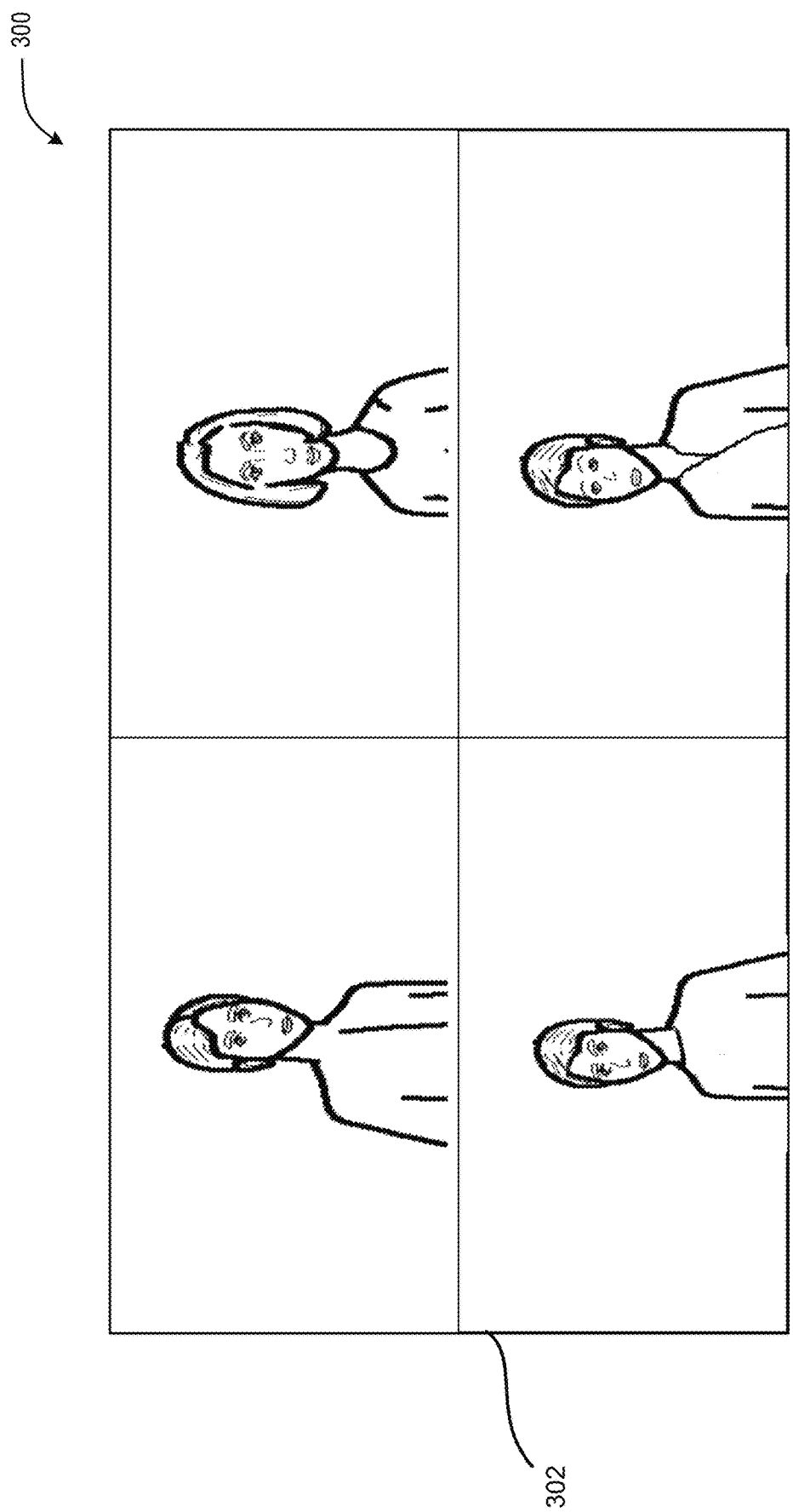
FIGS. 3A-3C are screenshot views of a display corresponding to one of the client computing devices in a teleconference session illustrating a first user interface arrangement that presents the teleconference session view for a teleconference session.
Figure 3B:
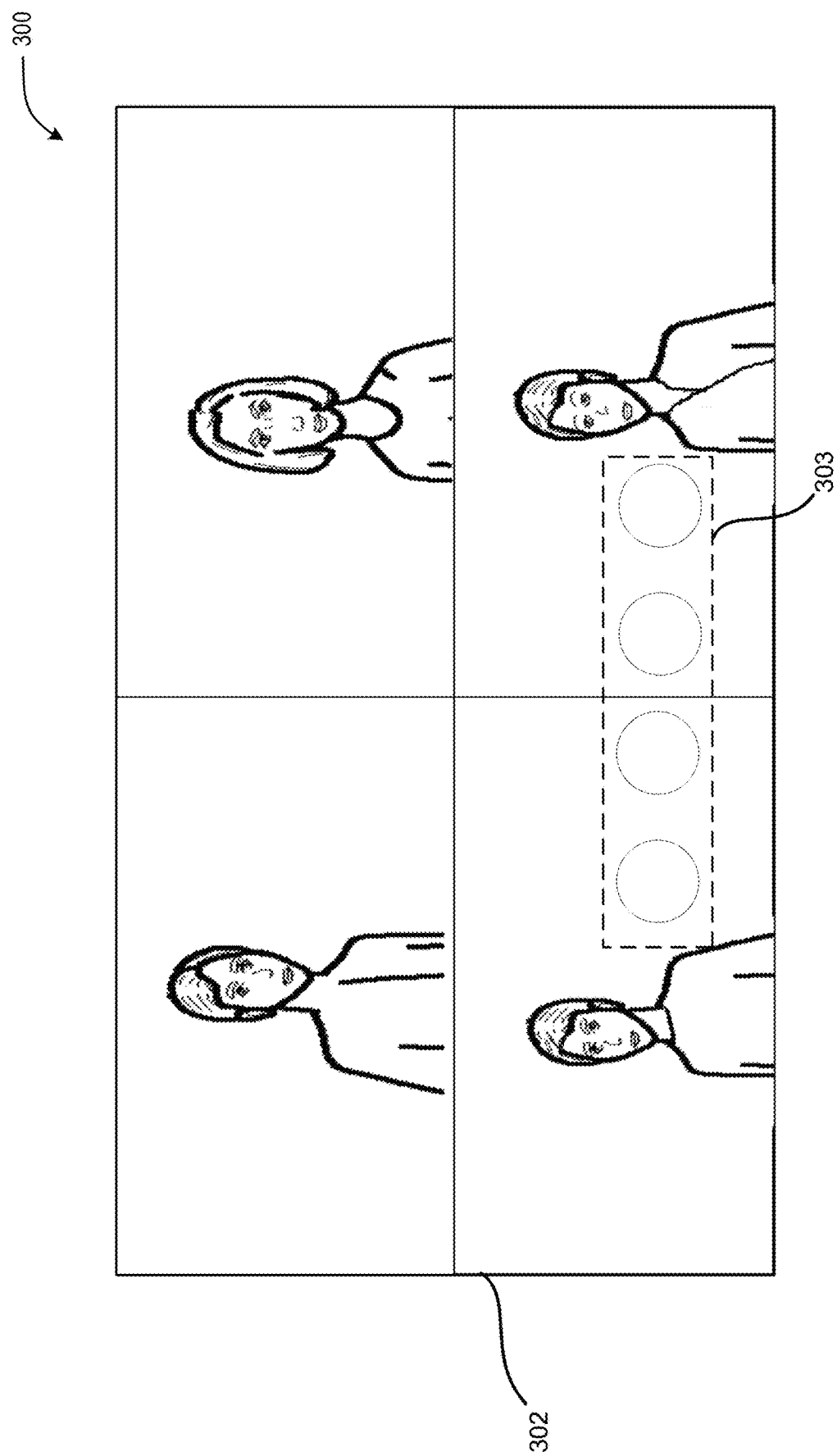
Figure 3C:
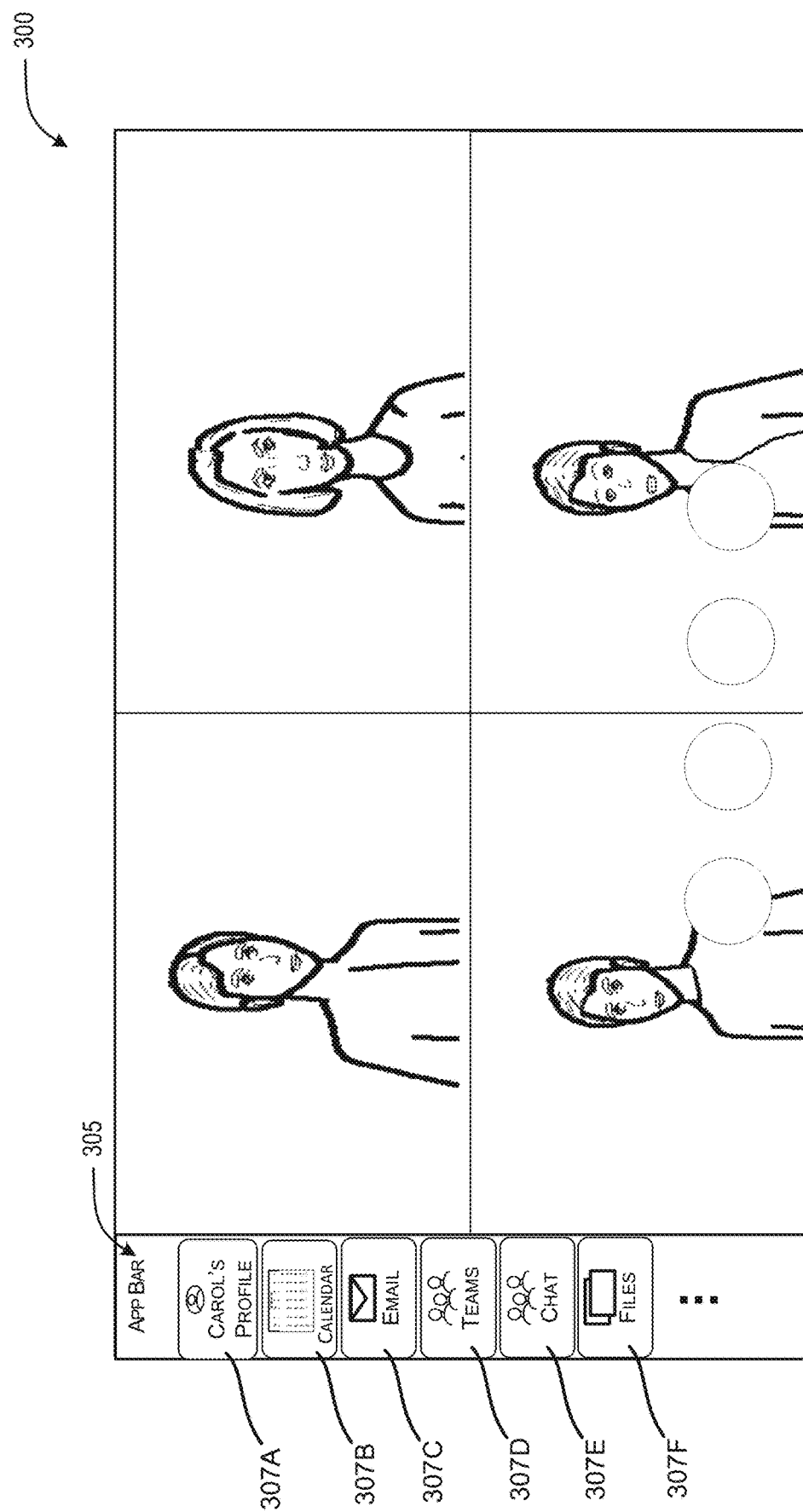

As summarized above, the techniques disclosed herein provide an integrated multitasking interface for teleconference sessions. Several examples of such user interfaces are shown in the figures. Specifically, FIG. 3A-4H illustrate aspects of a user interface 300 that can be displayed on a device 106 in communication with a teleconference session 104. This example user interface 300 can be displayed on a device 106, such as a desktop computer, mobile device or a combination of devices. Specifically, FIGS. 3A-3C illustrate aspects of a user interface 300 during a teleconference session prior to the selection of content to be viewed. FIGS. 4A-4H illustrate aspects of the user interface 300 that is displayed after the selection of content or a selection of a category of functionality. This example user interface 300 shows content that is associated with the category of functionality, which is displayed concurrently with the renderings of one or more streams of a teleconference session 104.

As shown in FIG. 3A, the user interface 300 includes renderings of the plurality of video streams within a first graphical user interface arrangement rendered on a display device of a client computing device 106. In this example, a number of participants of a teleconference session are displayed. Although this example shows an arrangement having four video streams of meeting participants, it can be appreciated that the user interface 300 can include any number of participants and also show representations of the participants, such as an avatar. It can also be appreciated that content can be shared by any of the participants. In this example, the video streams are rendered in an edge-to-edge format within a frame 302 of the user interface 300.

FIG. 3B illustrates another aspect of the user interface 300. In this example, the user interface 300 comprises a number of core controls 303, which can be configured to control aspects of the teleconference session 104. For instance, a first button of the core controls 303 can disconnect a device 106 from the teleconference session 104. A second button of the core controls 303 can control the microphone of the device 106, i.e., a mute button. A third button of the core controls 303 can control the camera of the device 106, i.e., toggle the camera on or off. A fourth button of the core controls 303 can be used to add users to the session 104. In response to receiving the user actuation of the fourth button, a menu can be displayed enabling users to select other users to become meeting participants. These examples are provided for illustrative purposes and are not to be construed as limiting. It can be appreciated that the core controls 303 can involve any suitable functionality related to the teleconference session 104. For instance, one or more buttons of the core controls 303 can change limits bandwidth related to the video data streams, display properties, etc. In some configurations, the display of the core controls 303 can fade over a predetermined time period. In such configurations, the core controls 303 can be redisplayed based on one or more actions, such as a hover or another suitable user gesture within a predetermined portion of the user interface.

FIG. 3C illustrates yet another aspect of the user interface 300. In this example, the user interface 300 comprises an application bar 305 (also referred to herein as an "app bar"). The application bar 305 can be configured with a number of graphical elements 307 (individually referenced as 307A, 307B, 307C, etc.) each associated with different functionality or content. In the illustrative example of FIG. 3C, a number of selectable graphical elements 307 can provide access to content data having a number of predetermined data types including, but not limited to, profile data, calendar data, email data, team forum data, chat forum data, image data, video data, document data, and other data types accessible by a computing device. The selectable graphical elements 307 can each provide access to files having data types and/or a category of functionality, such as a calendar program, email program, team forum program, chat forum program, image program, video program, document program, and other programs.

For illustrative purposes, profile data can include a user's name, ID, phone number, or any other information associated with the user. The profile data can be accessed and displayed in response to a user selection of the first ("Profile") graphical element. Calendar data can include a user's appointments stored in one or more calendar databases. The calendar data can be accessed and displayed in response to a user selection of the second ("Calendar") graphical element. Email data can include a user's email messages and tasks stored in one or more email databases. The email data can be accessed and displayed in response to a user selection of the third ("Email") graphical element. These examples of content data are provided for illustrative purposes and are not to be construed as limiting. It can be appreciated that other types of content data can be listed on the App bar 305 and made available for selection and display on the graphical user interface 300.

For illustrative purposes, a team can include one or more specified of users. In some configurations, a team includes a specified group of users that are invited to a team. Data associated with the team, such as related messages and chat discussions, cannot be accessed by any user unless the user receives an invitation and accept the invitation. Once a user is invited to a team, that user can join one or more "channels" associated with the team. A channel, also referred to herein as a "channel forum," is a custom group of users interested in a particular subject matter. For example, a team may have a "legal topics" channel, a "development schedule" channel, etc. Users of a group of may participate in a channel forum independent of their involvement in a teleconference session. Thus, a participant of a teleconference session can be involved with a channel that involves users that are not participants of the teleconference session. As will be described in more detail below, users associated with a channel can share and view text, images and other data objects posted within a specific channel forum. The techniques disclosed herein can utilize channel communication data to define the channel forum functionality described herein.

A chat, also referred to as a "chat forum," can include a specified group of users. In some configurations, users are only included in a chat by invitation. A chat session may exist between a group of users independent of their involvement in a teleconference session. Thus, a participant of a teleconference session can chat with users that are not participants of the teleconference session. Users associated with a chat forum can share and view text, images, and other data objects posted within a specific chat forum.

For illustrative purposes, files can include any data structure stored in any suitable format. The files can be stored on a client computing device 106 or one or more remote computers such as the server device 110. Actuation of the corresponding graphical elements, e.g., 307F, of the app bar 305 can cause the display of a file or a list of files.

As summarized above, once content is selected or a category of functionality is selected, e.g., a menu option of the app bar is selected, a device 106 can generate a user interface arrangement allowing users to view the selected content along with one or more video streams of a teleconference session 104. In some configurations, in response to receiving the selection of the content data, the device 106 can transition from the first graphical user interface (FIGS. 3A-3C) to a second graphical user interface (FIGS. 4A-4H) having a first display area 401 and a second display area 402. In addition, the device 106 can display renderings of the selected content within the first display area 401 of the second graphical user interface arrangement, and display a plurality of video streams of a teleconference session 104 within the second display area 402 of the second graphical user interface arrangement.

Figure 4A:
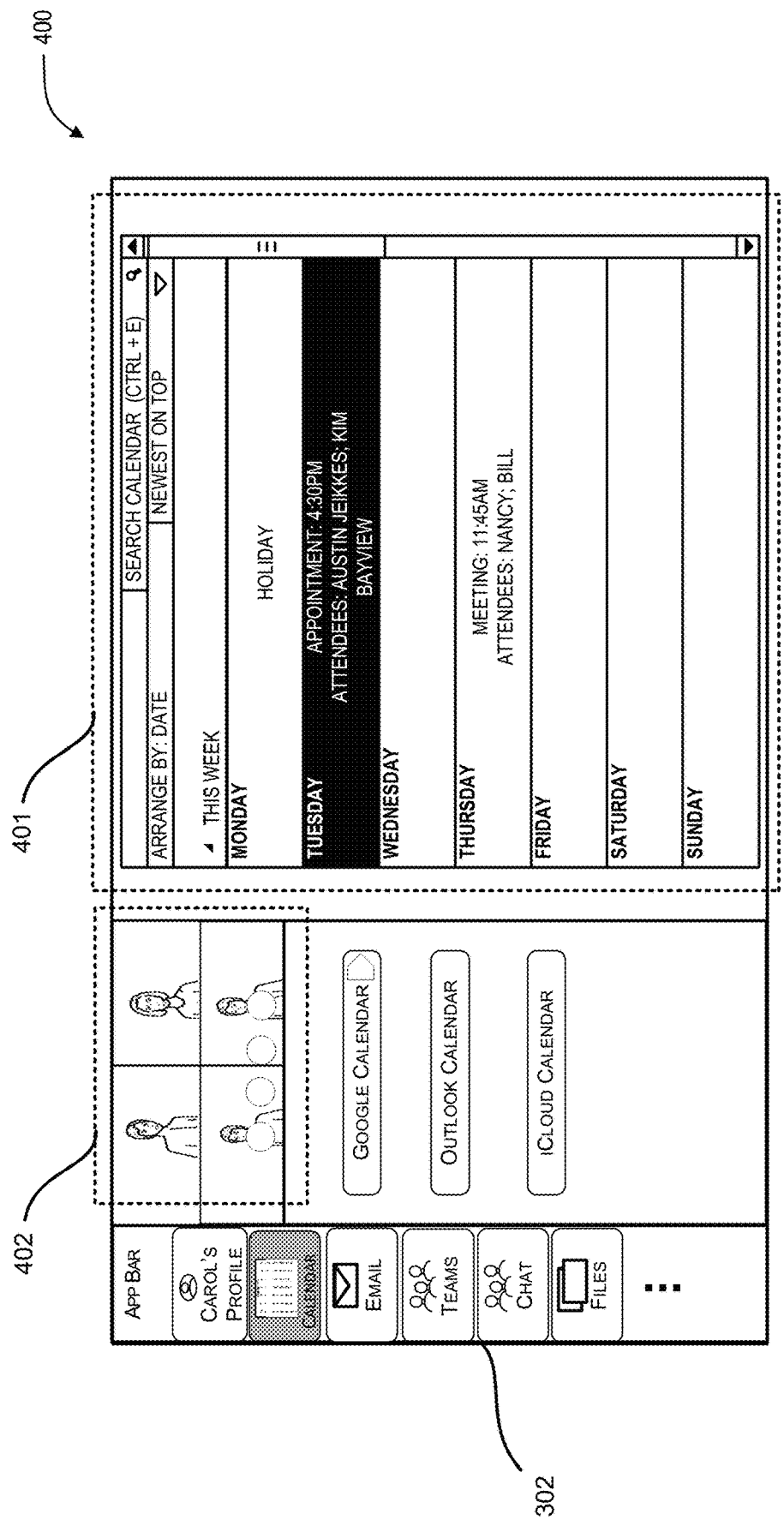
FIGS. 4A-4H are screenshot views of a display corresponding to one of the client computing devices in the teleconference session illustrating multi-tasking views concurrently displayed with a teleconference monitor view.

FIG. 4A illustrates an example user interface 400 that is displayed when the device 106 receives an actuation of the "Calendar" interface element, 307B on FIG. 3C, of the app bar. In response to the selection, the device 106 retrieves the content data from one or more other program modules 132, and displays the content data, e.g., calendar data, in the same user interface 400 as the video streams of the teleconference session 104. More specifically, the content data is displayed in the first display area 401 and the video streams of the teleconference session 104 are displayed in the second display area 402, e.g., the teleconference monitor view. Also shown, the second graphical user interface arrangement 400 (also referred to herein as a "second user interface 400" or a "multi-tasking view 400") can be configured to include core controls within the second display area 402. The core controls can be configured with the functionality described herein.

Figure 4B:
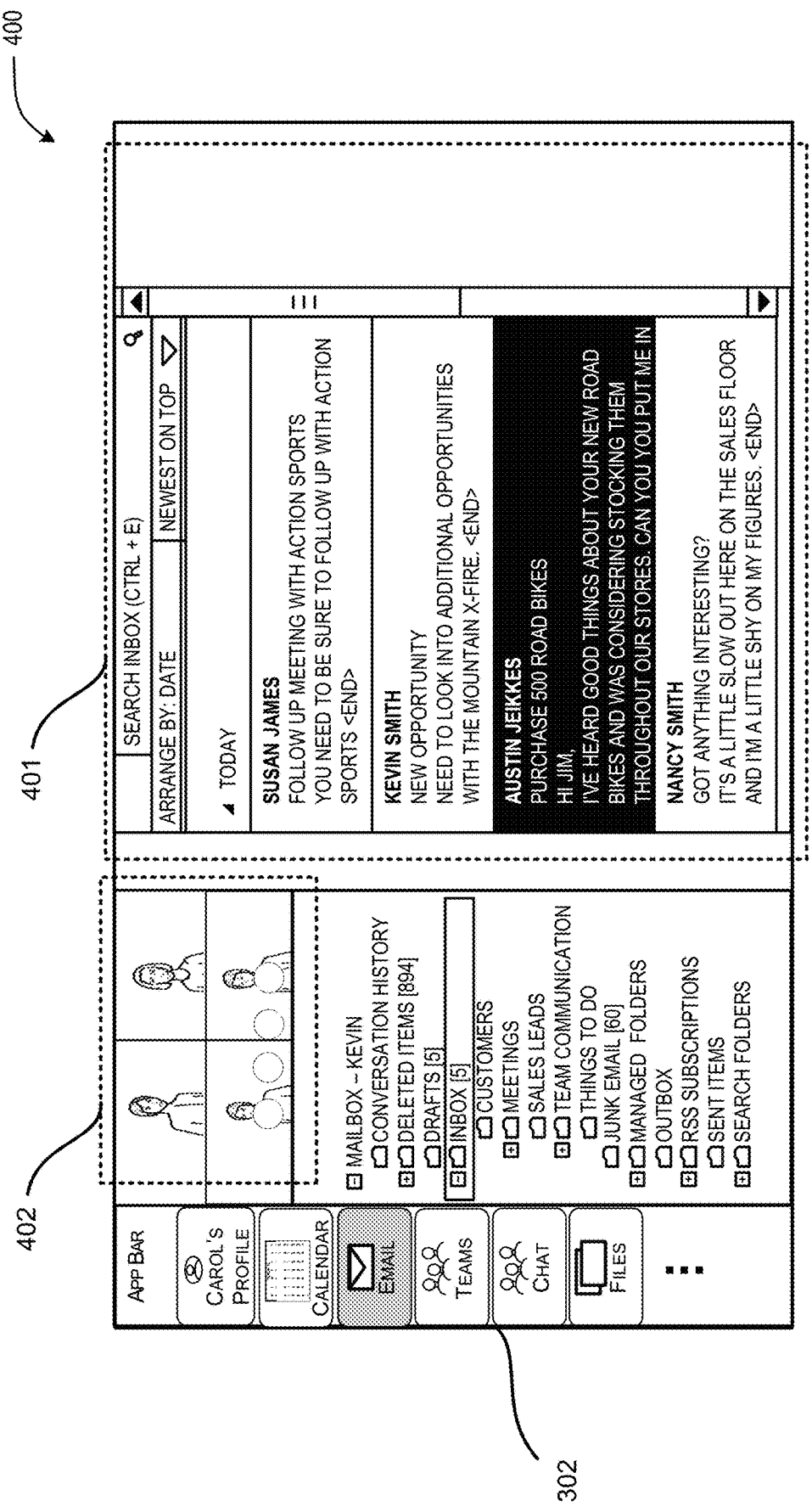

FIG. 4B illustrates an example user interface 400 that is displayed when the device 106 receives an actuation of the "Email" interface element, 307C, of the app bar. In response to the selection, the device 106 retrieves email from one or more other program modules 132, and displays the emails in the same user interface 400 as the video streams of the teleconference session 104. As shown, emails and other related data are displayed in the first display area 401, and the video streams of the teleconference session 104 are displayed in the second display area 402.

Figure 4C:
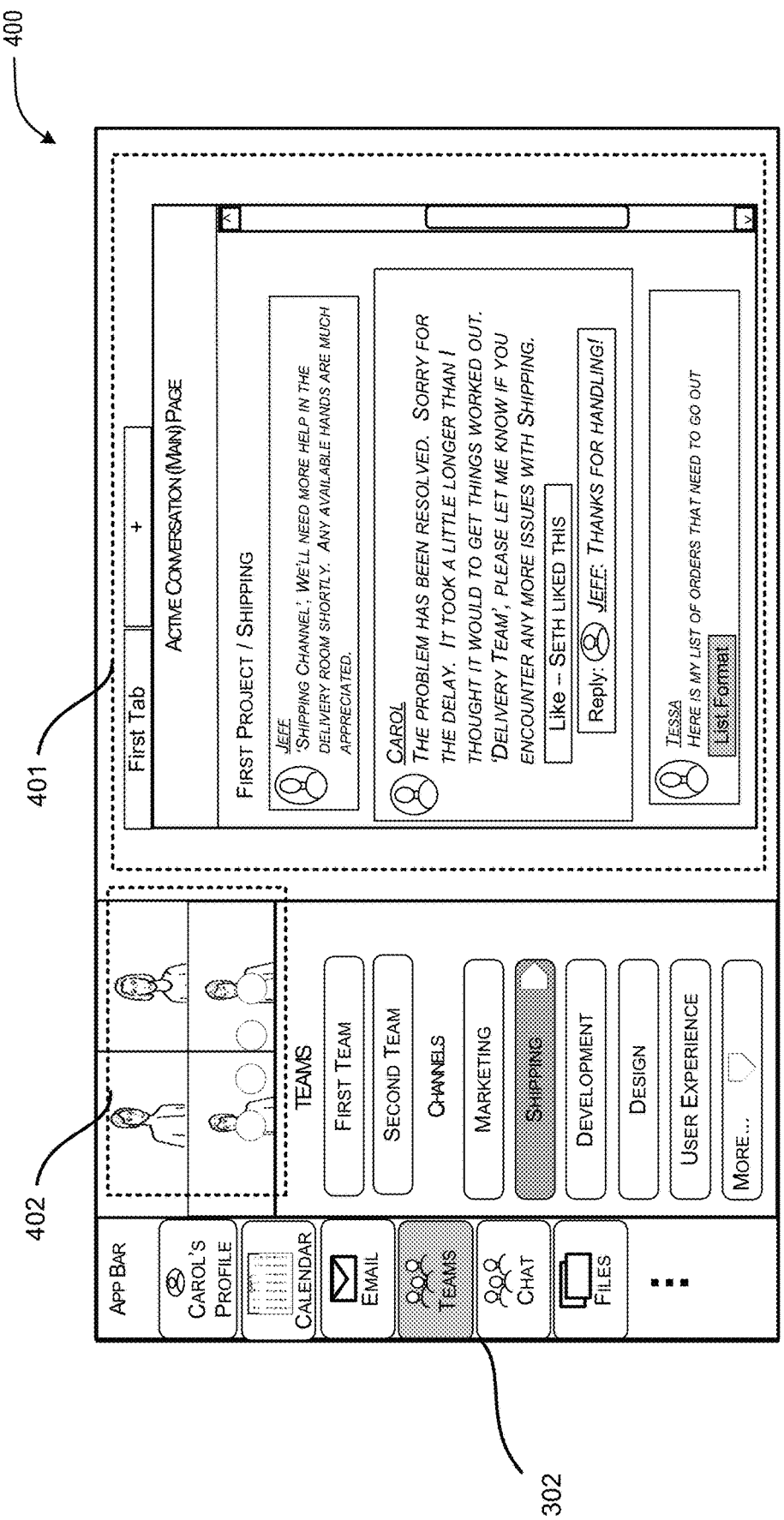

FIG. 4C illustrates an example user interface 400 that is displayed when the device 106 receives an actuation of the "Team" interface element, 307D of FIG. 3C, of the app bar. In response to the selection, the device 106 retrieves team data and other related data from one or more program modules 132, and displays the team data and the related data in the same user interface 400 as the video streams of the teleconference session 104. Also shown, the user interface 400 includes a section showing various teams and channels associated with a user. Different channels or teams can be selected. For example, the user can select the "Shipping" button to view the contents of that channel.

Figure 4D:
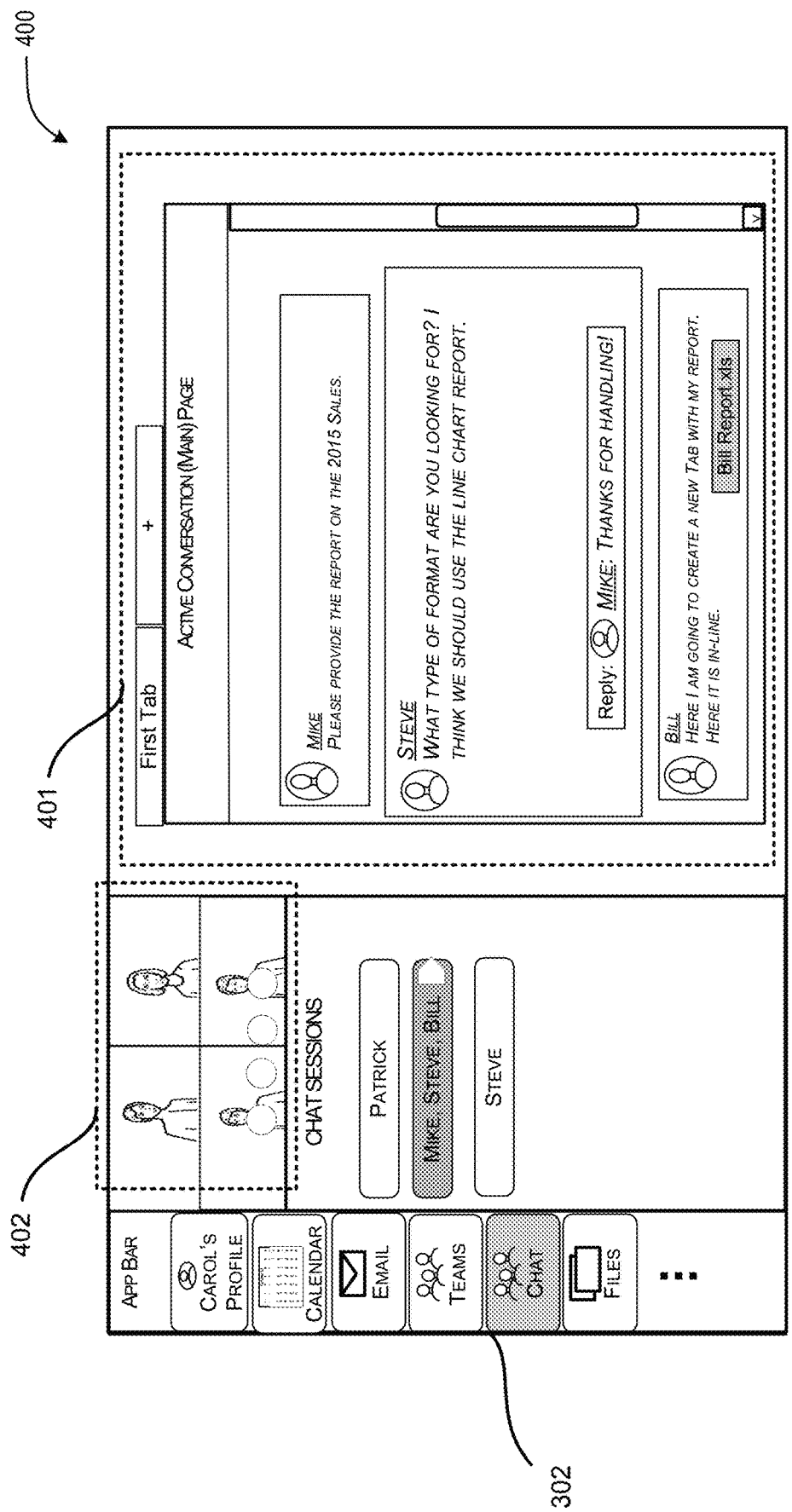

FIG. 4D illustrates an example user interface 400 that is displayed when the device 106 receives an actuation of the "Chat" interface element, 307E of FIG. 3C, of the app bar. In response, the device 106 retrieves chat data from one or more other program modules 132, and displays the chat data in the same user interface 400 as the video streams of the teleconference session 104. Also shown, the user interface 400 includes a section showing various chat forums associated with a user. The user can select different chat forums by the use of a corresponding graphical element. For example, the user can select the "Mike Steve and Bill" button to view the contents of that chat session.

It can be appreciated that a user may have difficulty locating specific items of a chat forum or a channel forum. This can happen when a conversation has a number of text entries and object entries, and a user is required to scroll through a lengthy conversation to find a particular item. To address this issue, the techniques disclosed herein provide access to high-priority documents or other high-priority objects, by the use of a tab.

Figure 4E:
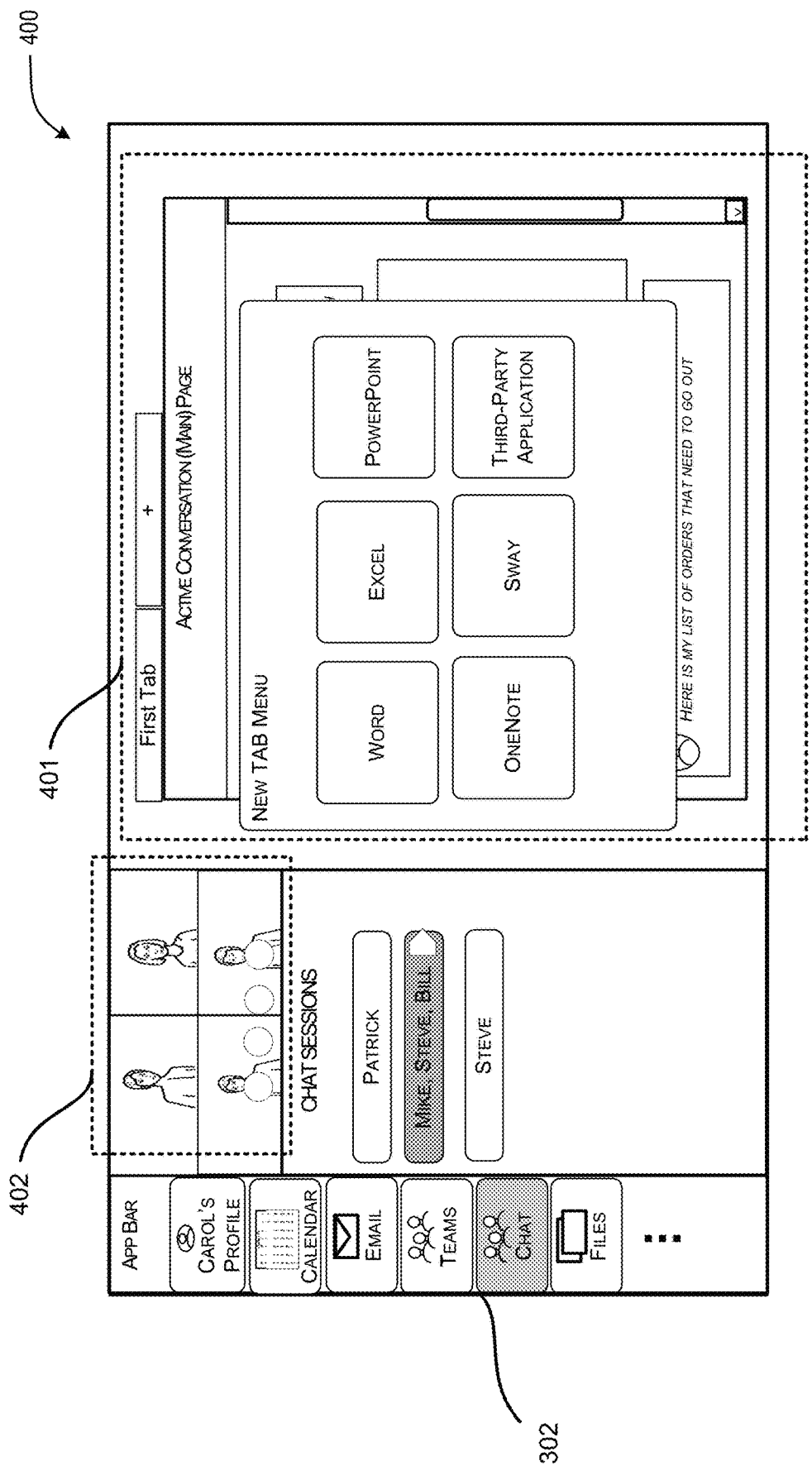
Figure 4F:
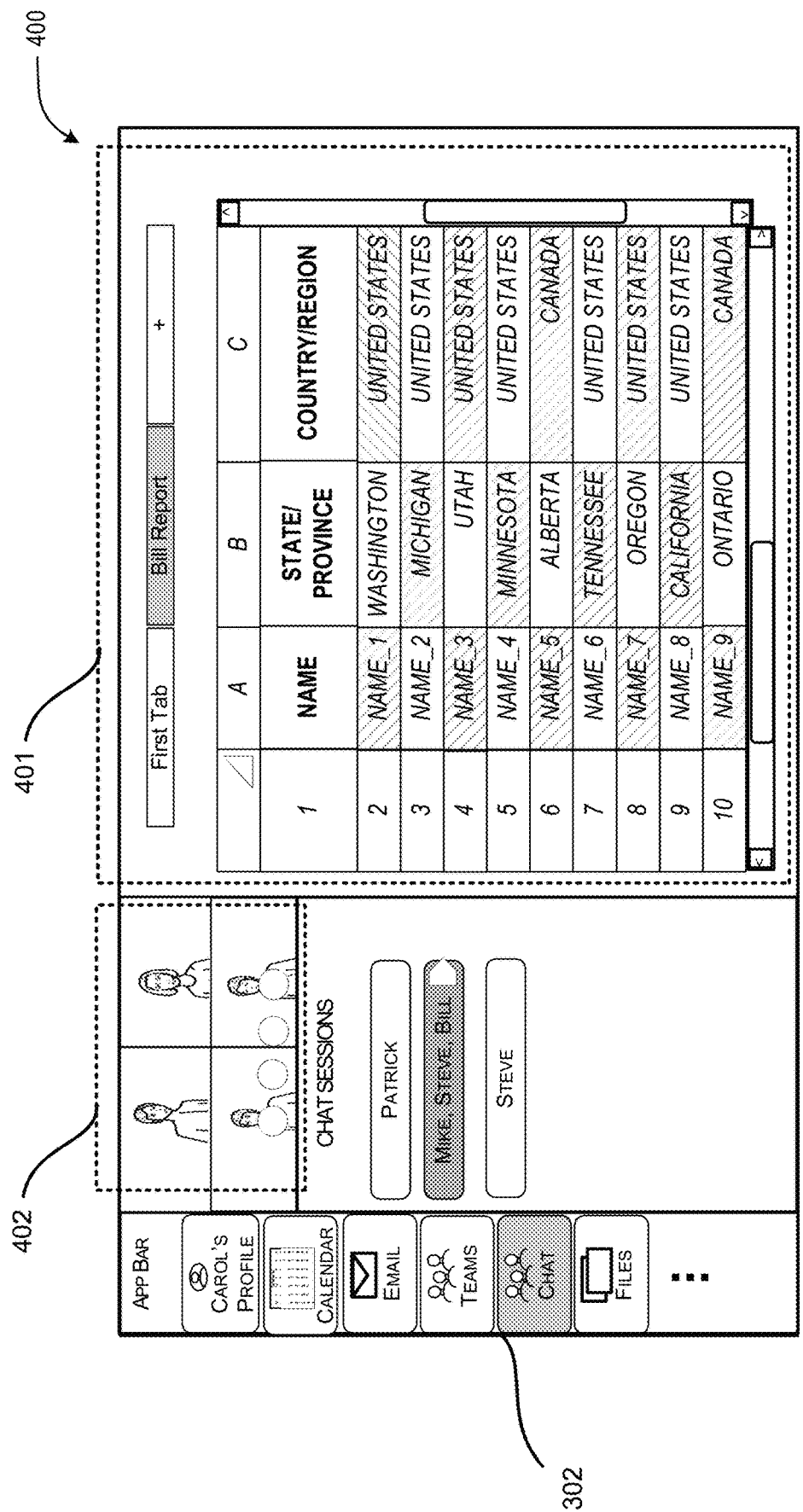

With reference to FIG. 4D, a user can actuate the new tab button (the "+" user interface element) to create a new tab. In response, the device 106 can display menu options providing access to one or more resources. In some configurations, the resources can include a number of applications that can be executed by the client device 106 or by the server device 110. As shown in FIG. 4E, a menu can be displayed in the first display area of the graphical user interface 400 allowing a user to select one or more resources, e.g., one or more categories of functionality. In this illustrative example, the resources include a word processing program, a spreadsheet program, a presentation program, a note program, a weblog program, or a third-party application. These examples are provided for illustrative purposes and are not to be construed as limiting. It can be appreciated that a computing device 106 can utilize resources from any suitable device, including a website or service. For illustrative purposes, consider an example where a user selects the spreadsheet application to create a new file or open an existing file. In such an example, as shown in FIG. 4F, a tab can be created to display the file contents along with the video streams of the session 104. Users viewing a chat or channel can then use the tab to access the file regardless of the scroll position of the chat forum or the channel forum.

Figure 4G:
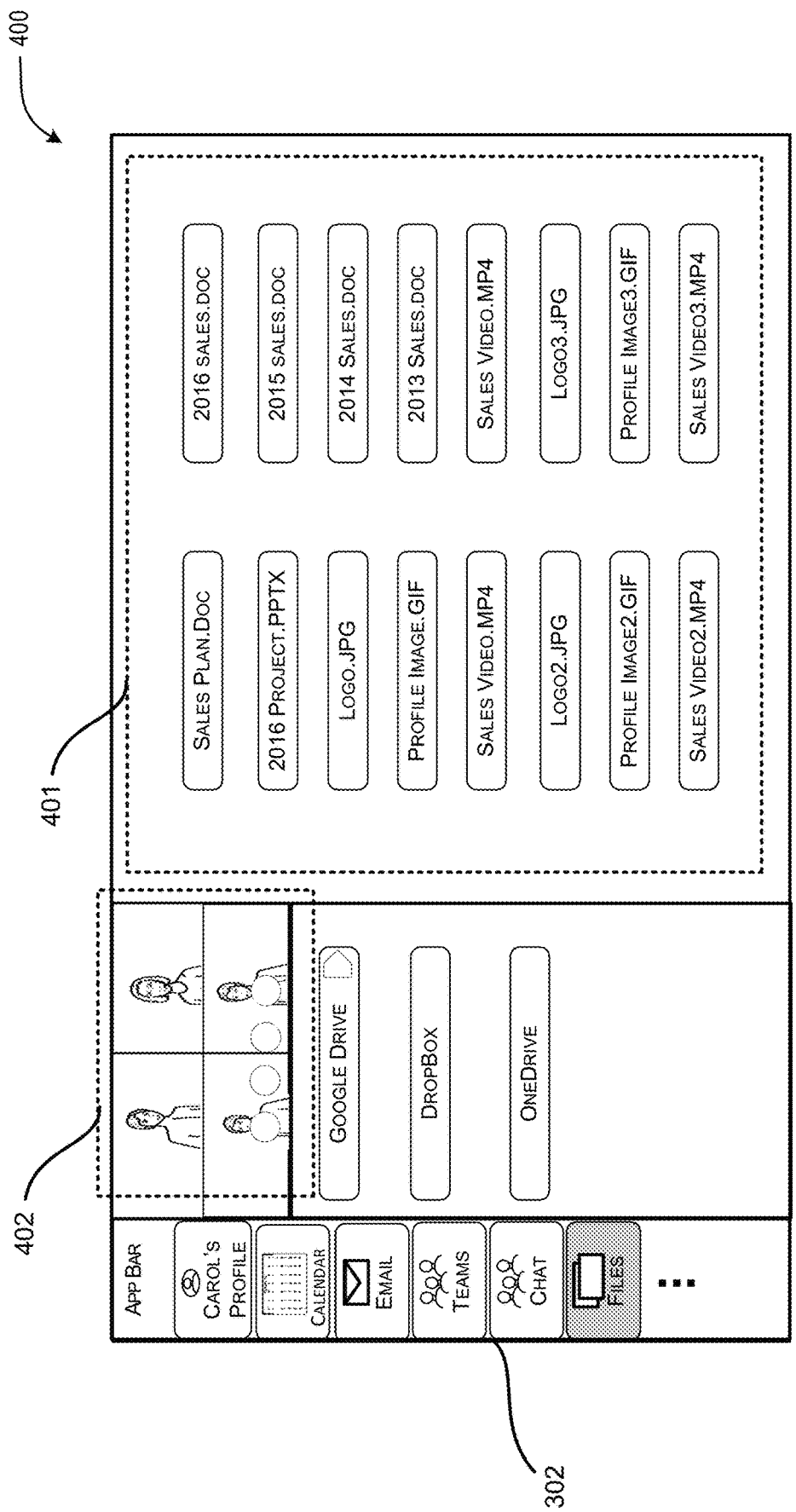
Figure 4H:
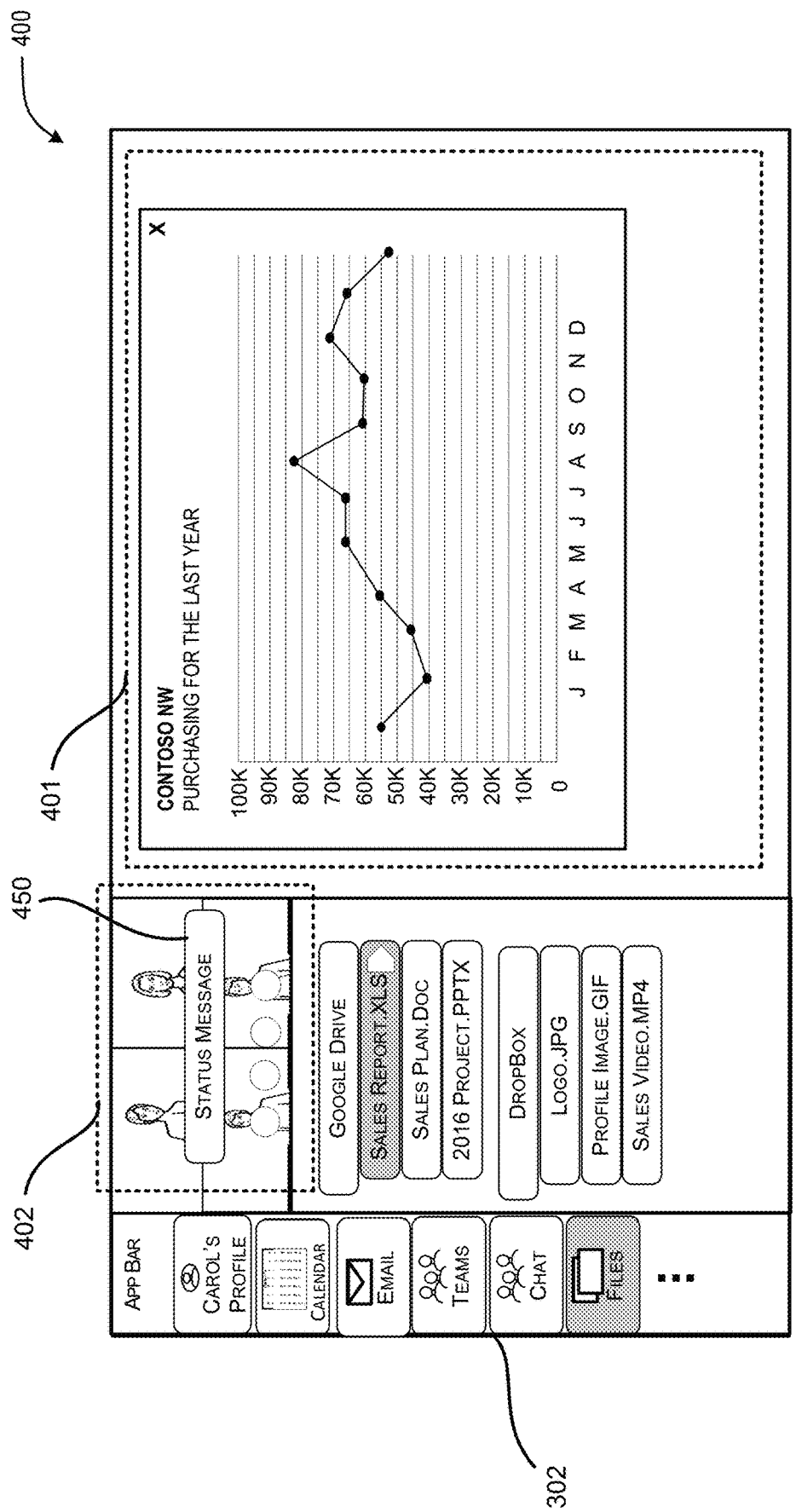

FIG. 4G illustrates an example user interface 400 that is displayed when the device 106 receives an actuation of the "File" interface element, 307F on FIG. 3C, of the app bar. In response to the selection, the device 106 retrieves a list of files from one or more program modules 132, and displays the list of files in the same user interface 400 as the video streams of the teleconference session 104. In this example, files are listed in the first display area 401 of the graphical user interface 400. As shown in FIG. 4H, in response to a selection of an individual file, the contents of the selected file can be displayed in the first display area 401 of the graphical user interface 400. As shown, the contents of the selected file can be displayed in conjunction with one or more video streams of the teleconference session 104.

In some configurations, the second display area 402 of the graphical user interface 400 can be configured to provide one or more alerts associated with the teleconference session 104. For example, a computing device 106 can display an alert indicating bandwidth issues associated with the teleconference session. The display of the alerts can be within the second display area 402 of the graphical user interface 400.

In some configurations, a document or other data object can be shared with the teleconference session 104 by the use of a drag-and-drop feature. For instance, a data object, such as an appointment (FIG. 4A), can be rendered in the second display area 402 of the graphical user interface 400. By the use of a pointing device or a touch-screen, a user can drag a selected object, such as an appointment, to the second display area 402 of the user interface 400. In response, the computing device 106 can share the selected object with other participants of the teleconference session 104. This example is provided for illustrative purposes and is not to be construed as limiting. It can be appreciated that other objects disclosed herein, such as a file, text of a chat forum, or any other data object can be shared with participants of a teleconference session 104 using the described drag-and-drop functionality. In one example, a method of the present disclosure can include a system that receives a selection of a file from the plurality of files. The system can also receive an input command indicating a gesture to move the file from the first display area (401) comprising the graphical elements, e.g., an area where file icons are displayed, to the second display area (402), e.g., where the streams are displayed. In response to the input command, the system can share the file with computing devices associated with users participating in the teleconference session. The shared files can be communicated to the computing devices associated with users participating in the teleconference session, or a stream of the files can be communicated to the computing devices associated with users participating in the teleconference session.

In some configurations, the teleconference monitor view displayed in conjunction with a multi-tasking view can be configured to display salient content of the teleconference session 104. In one illustrative example, a user may interact with a teleconference session 104 through a teleconference session view using a first application, such as one managing a teleconference session 104. The teleconference session view can display a plurality of streams, where the plurality of streams may contain images and/or videos of people or shared content. When the user transitions the teleconference session view to a multi-tasking view using a second application, such as a word processing or chat application, the system selects one or more streams of the plurality of streams based on an activity level associated with the one or more streams. The one or more streams that is selected using data indicating an activity level is then rendered in a teleconference monitor view within a multitasking view.

In configuring the teleconference session view, streams of a teleconference data may be arranged and/or selected in a teleconference session view based on an activity level for each stream provided by each participant. The video or shared content in the stream for each participant may be analyzed to determine an activity level for any stream of a teleconference data. In some configurations, where a client computing device configures a view or UI based on a participant's activity, a server can generate data indicating an activity level associated with individual streams of the teleconference data. The data indicating an activity level associated with individual streams can be communicated to the client computing device or used at a server to select or rank a stream. Also, in some configurations, the client computing device can generate data indicating an activity level associated with individual streams of the teleconference data.

The activity level can be based on the analysis of individual streams of the teleconference data, and an activity level can be associated with a group of participants, individual participants, or content. The activity level can be based on any type of activity including, but not limited to, the following examples. Participant motion: the extent to which a participant moves in the video may determine the participant's activity level. Participants in the process of gesturing or otherwise moving in the video may be deemed to be participating at a relatively high level in the teleconference. Participant lip motion: any video stream can be analyzed to determine the extent to which a participant's lips move as an indication of the extent to which the participant is speaking Participants speaking at a relatively high level may be deemed to be participating at a corresponding relatively high level. Participant facial expressions: the participant's video may be analyzed to determine changes in facial expressions, or to determine specific facial expressions using pattern recognition. Participants reacting through facial expressions in the teleconference may be deemed to be participating at a relatively high level. Content modification: video of content or any electronic version of content being shared in the teleconference may be analyzed to determine if it is being or has been modified. The user interface element corresponding to content may be promoted and ranked in a display area or automatically promoted to another display area if the stream indicates the content is being modified. An extent or degree of modification, such as a frequency of modification, a number of people participating in the modification, along with other activity can be used to determine an activity level. Content page turning: video of content being shared may be analyzed to determine if there is page turning of a document, for example, and assigned a corresponding activity level. A number of participants having content in the first display area: video of content being shared may be assigned an activity level based on the number of participants that have a view of the content in the first display area or second display area. Participant entering teleconference session: a stream from participants entering a teleconference session may be associated with a high activity level. An activity level can be based on the order in which participants join a session. Participant leaving teleconference session: a stream from participants leaving a teleconference may be associated with a low activity level.

Figure 5A:
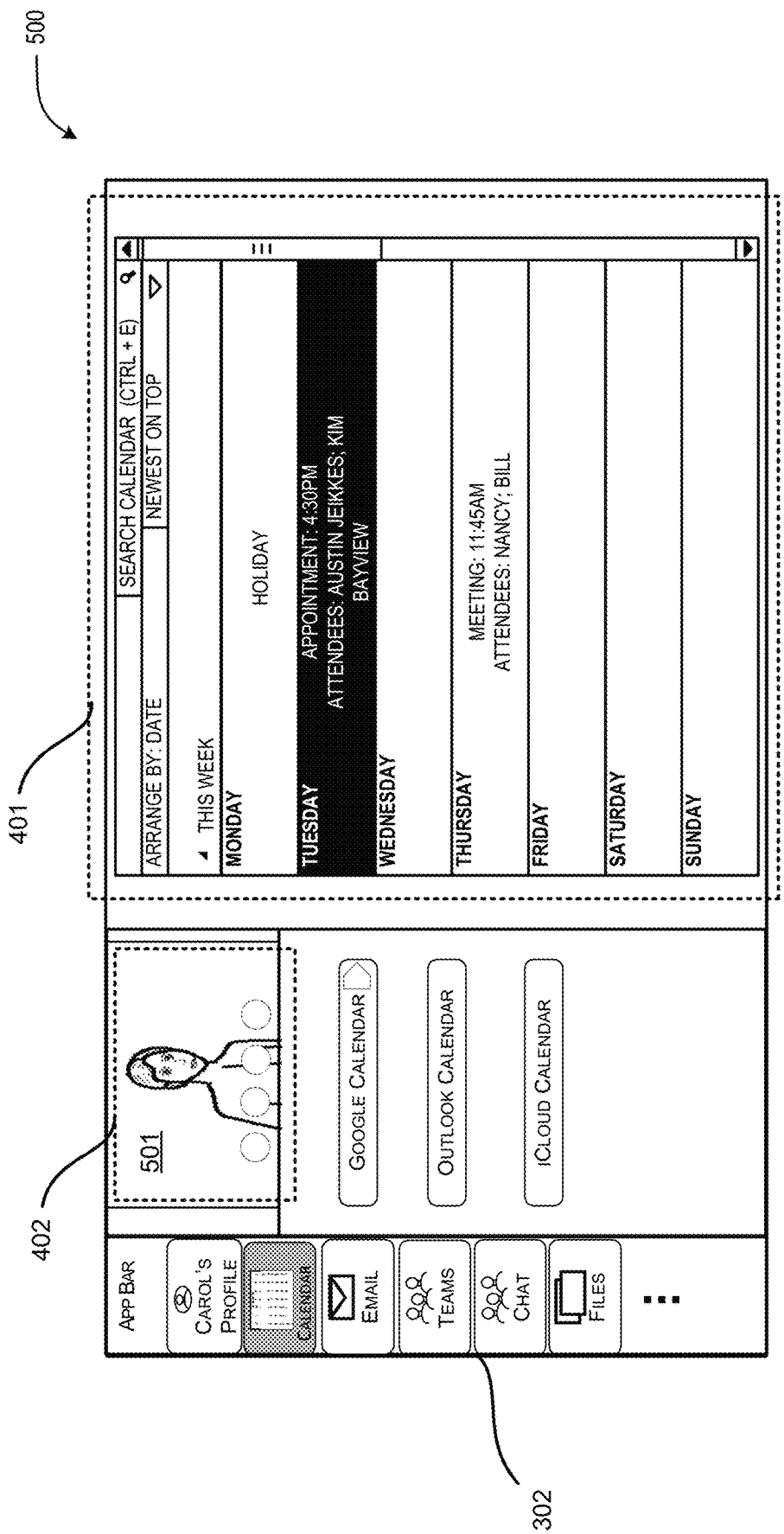
FIGS. 5A-5J are screenshot views of a display corresponding to one of the client computing devices in the teleconference session illustrating multi-tasking views concurrently displayed with a teleconference monitor view showing salient content.

FIGS. 5A-5H are screenshot views of a display corresponding to one of the client computing devices in the teleconference session illustrating multi-tasking views concurrently displayed with a teleconference monitor view showing salient content. In particular, FIG. 5A illustrates an example user interface 500 that is displayed when a device 106 receives an actuation of the "Calendar" interface element, 307B on FIG. 3C, of the app bar. In response to the selection, the device 106 retrieves the content data from one or more program modules 132, and displays the content data, e.g., calendar data, in the same user interface 500 as a rendering of one or more streams 501, e.g., selected streams 501, that are selected based on an activity level. More specifically, the content data is displayed in the first display area 401 and one or more selected streams 501 of the teleconference session 104 are displayed in the second display area 402, e.g., the teleconference monitor view. Also shown, the second graphical user interface arrangement 500 (also referred to herein as a "second user interface 500" or a "multi-tasking view 500") can be configured to include core controls within the second display area 402. The core controls can be configured with the functionality described herein.

Figure 5B:
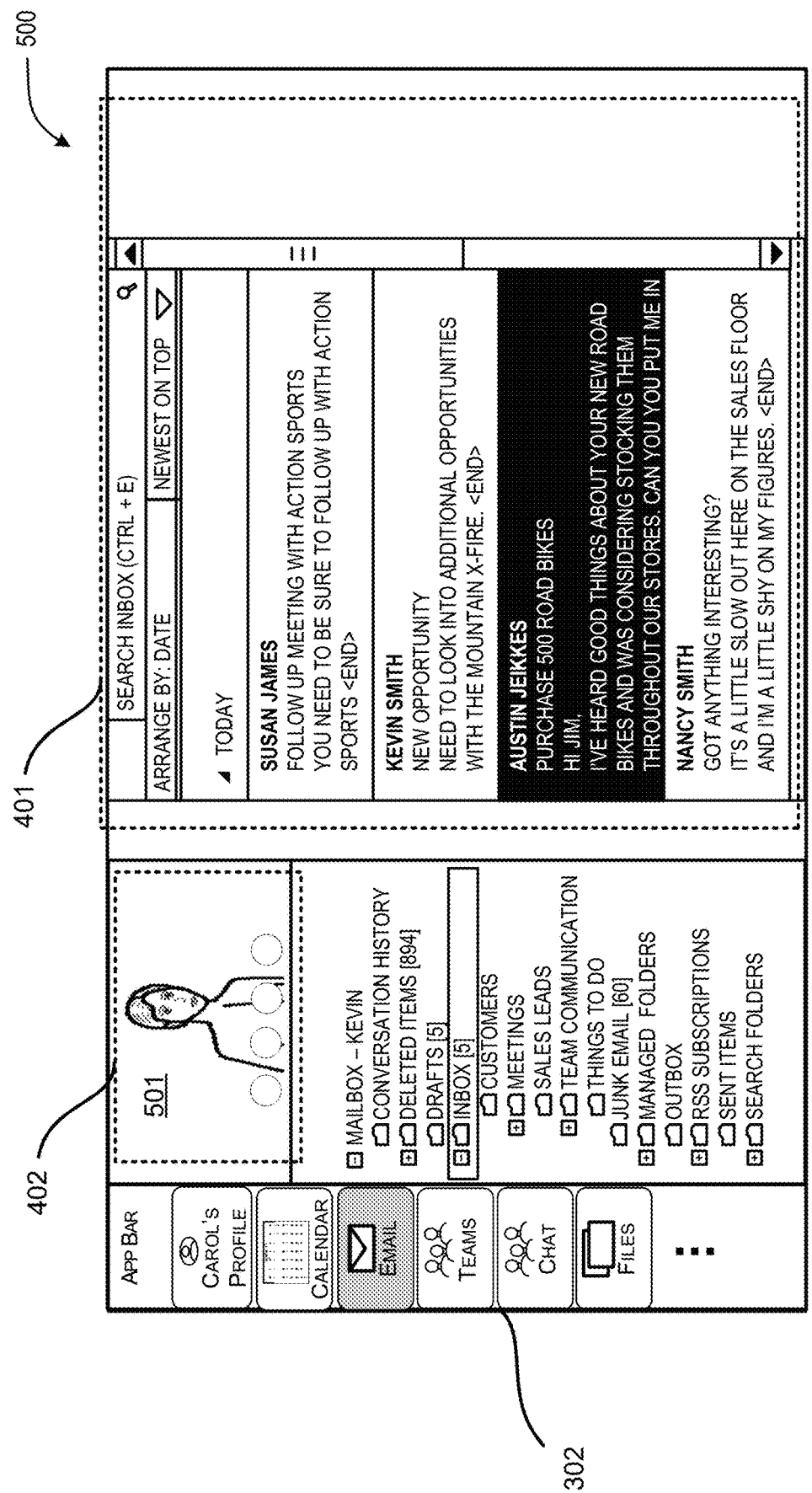

FIG. 5B illustrates an example user interface 500 that is displayed when the device 106 receives an actuation of the "Email" interface element, 307C on FIG. 3C, of the app bar. In response to the selection, the device 106 retrieves the content data from one or more program modules 132, and displays the content data, e.g., emails, in the same user interface 500 as a rendering of one or more streams 501 that are selected based on an activity level. As shown, emails and other related data are displayed in the first display area 401, and the selected stream(s) of the teleconference session 104 are displayed in the second display area 402.

Figure 5C:
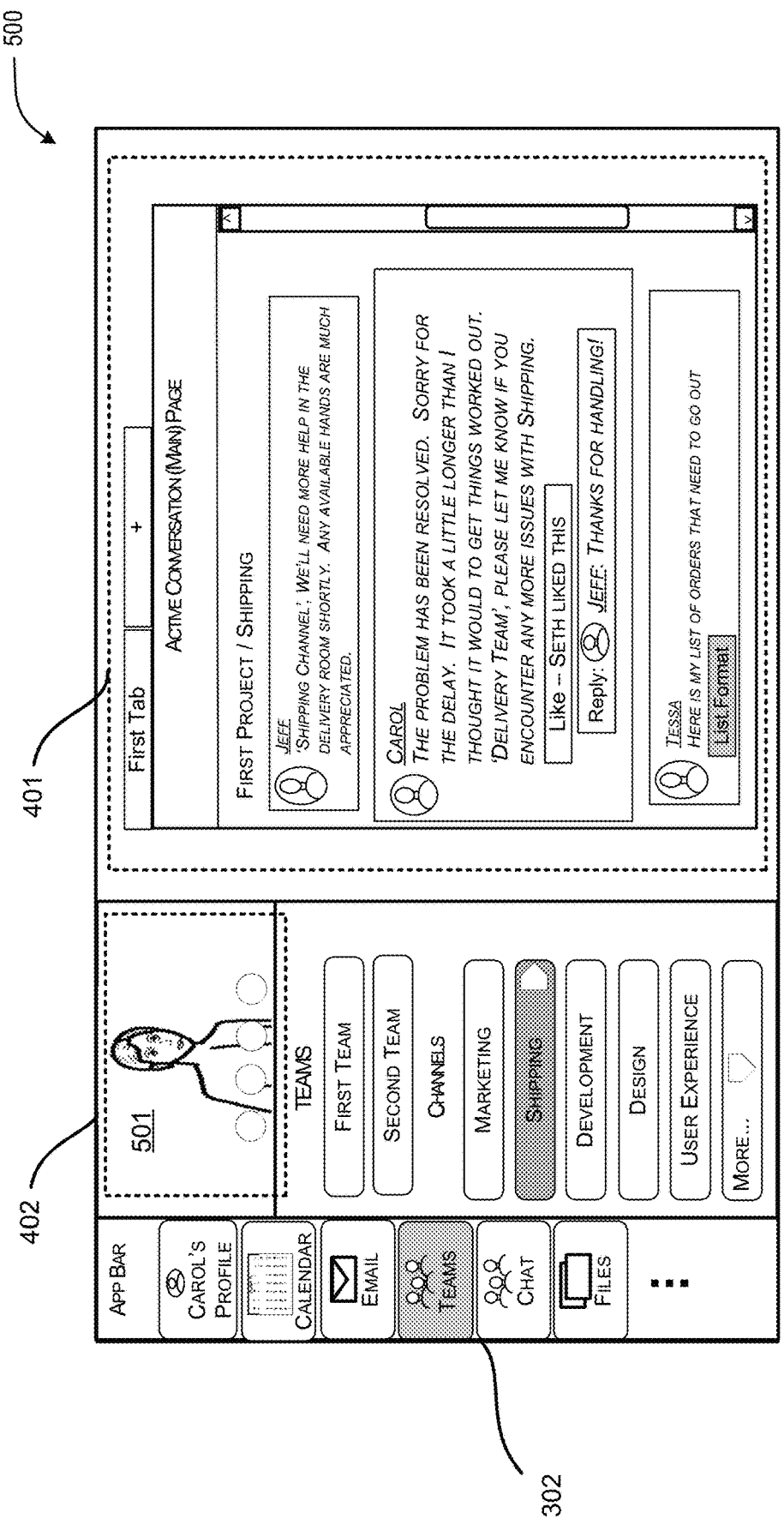

FIG. 5C illustrates an example user interface 500 that is displayed when the device 106 receives an actuation of the "Team" interface element, 307D on FIG. 3C, of the app bar. In response to the selection, the device 106 retrieves the content data from one or more program modules 132, and displays the content data, e.g., team data, in the same user interface 500 as a rendering of one or more streams 501 that are selected based on an activity level. As shown, the user interface 500 includes a section showing various teams and channels associated with a user. Different channels or teams can be selected. For example, the user can select the "Shipping" button to view the contents of that channel.

Figure 5D:
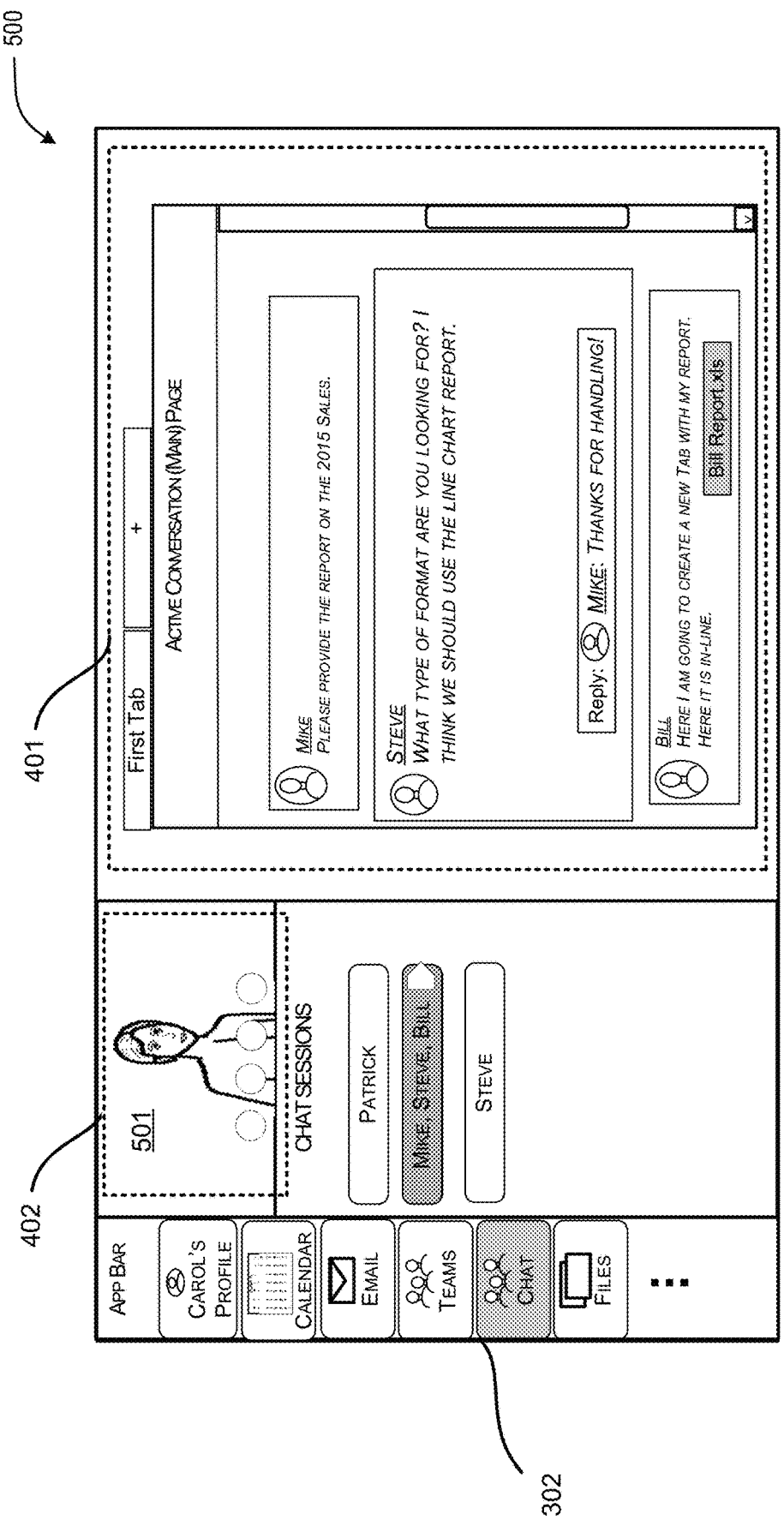

FIG. 5D illustrates an example user interface 500 that is displayed when the device 106 receives an actuation of the "Chat" interface element, 307E, of the app bar. In response, the device 106 retrieves chat data from one or more program modules 132, and displays the chat data in the same user interface 500 as a rendering of one or more streams 501 that are selected based on an activity level. As shown, the user interface 500 includes a section showing various chat forums associated with a user. The user can select different chat forums by the use of a corresponding graphical element. For example, the user can select the "Mike Steve and Bill" button to view the contents of that chat session.

It can be appreciated that a user may have difficulty locating specific items of a chat forum or a channel forum. This can happen when a conversation has a number of text entries and object entries, and a user is required to scroll through a lengthy conversation to find a particular item. To address this issue, the techniques disclosed herein provide access to high-priority documents or other high-priority objects, by the use of a tab.

Figure 5E:
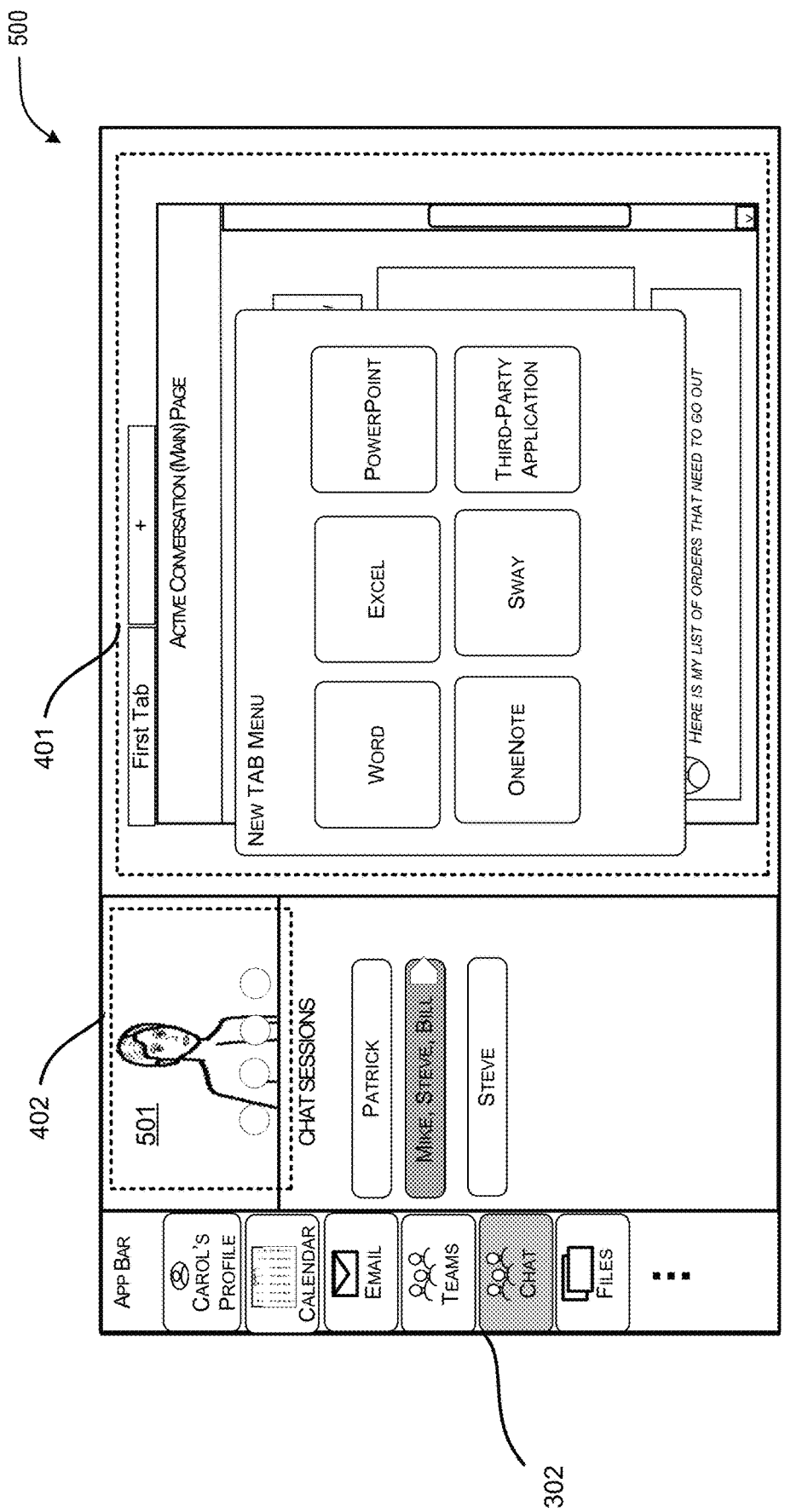

With reference to FIG. 5D, a user can actuate the new tab button (the "+" user interface element) to create a new tab. In response, the device 106 can display menu options providing access to one or more resources. In some configurations, the resources can include a number of applications that can be executed by the client device 106 or by the server device 110. As shown in FIG. 5E, a menu can be displayed in the first display area of the graphical user interface 500 allowing a user to select one or more resources, e.g., one or more categories of functionality. In this illustrative example, the resources include a word processing program, a spreadsheet program, a presentation program, a chat program, a messaging program, a file sharing program, a note program, a weblog program, or a third-party application. These examples are provided for illustrative purposes and are not to be construed as limiting. It can be appreciated that a computing device 106 can utilize resources from any suitable device, including a website or service.

Figure 5F:
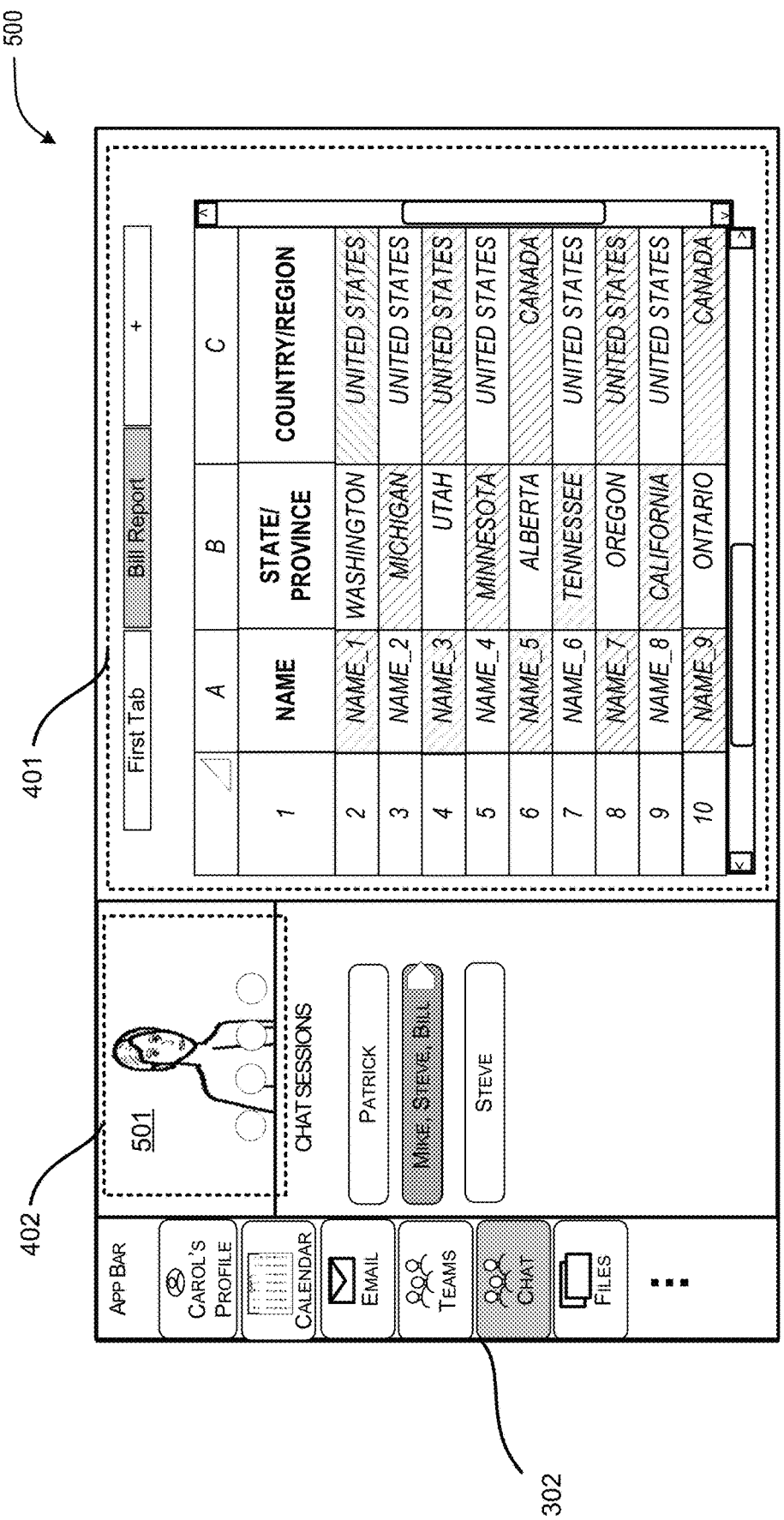

For illustrative purposes, consider an example where a user selects the spreadsheet application to create a new file or open an existing file. In such an example, as shown in FIG. 5F, a tab can be created to display the file contents along with streams 501 that are selected based on an activity level. Users wanting to view a chat or channel can then use the tab to access the file regardless of the scroll position of the chat forum or the channel forum. Streams that are selected based on an activity level are rendered concurrently with the content viewed in the selected tabs.

Figure 5G:
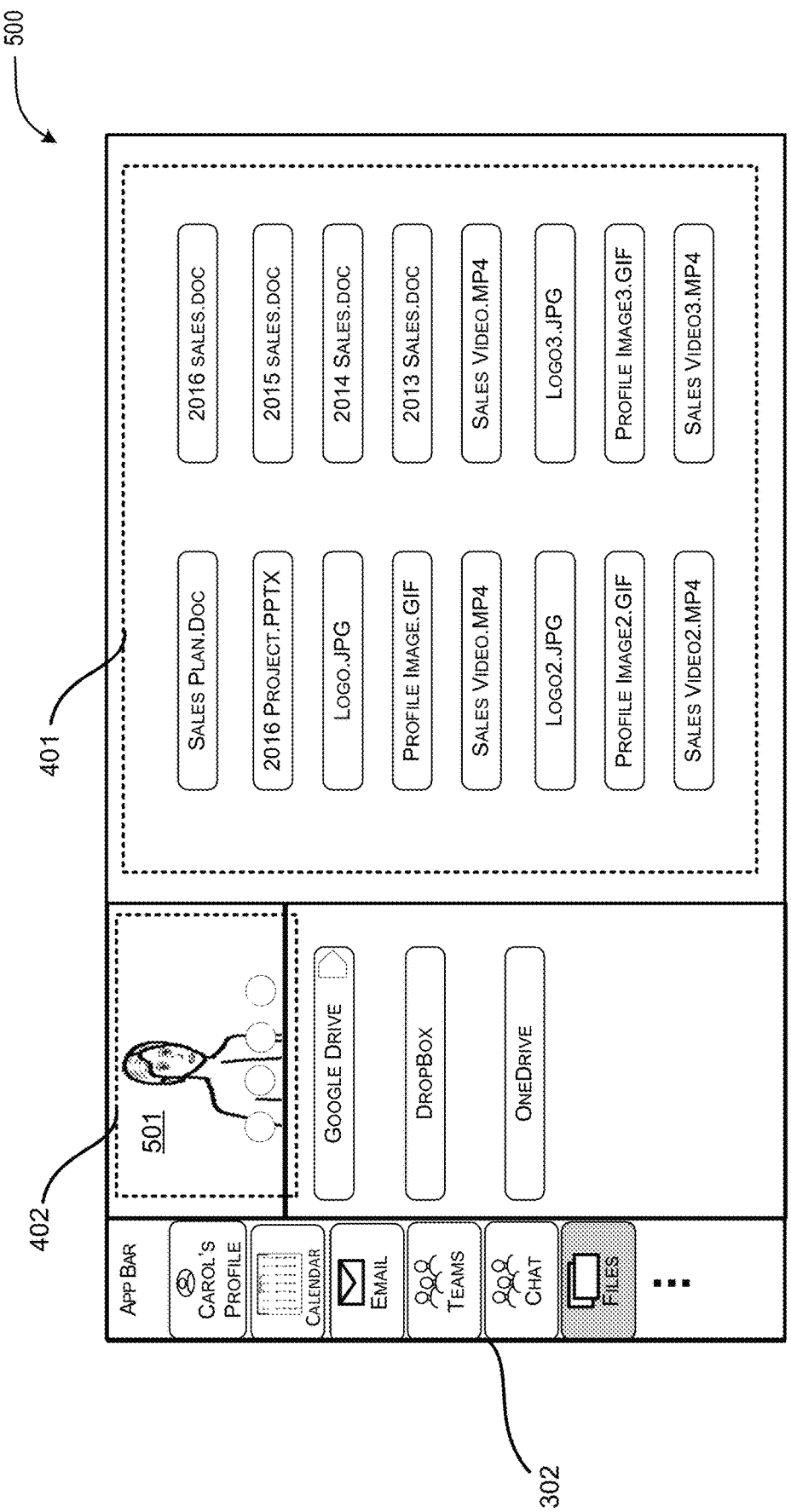

FIG. 5G illustrates an example user interface 500 that is displayed when the device 106 receives an actuation of the "File" interface element, 307F on FIG. 3C, of the app bar. In response to the selection, the device 106 retrieves a list of files from one or more program modules 132, and displays the list of files in the same user interface 400 as the streams 501 that are selected based on an activity level. In this example, files are listed in the first display area 401 of the graphical user interface 500. Although the examples herein illustrate an implementation where content data is retrieved from one or more program modules, it can be appreciated that such functionality includes the action of retrieving the content data from any data storage module for providing a program module access to and the ability to display content data. In the above examples, the selected streams are rendered in the second display area 402 of interfaces 500.

Figure 5H:
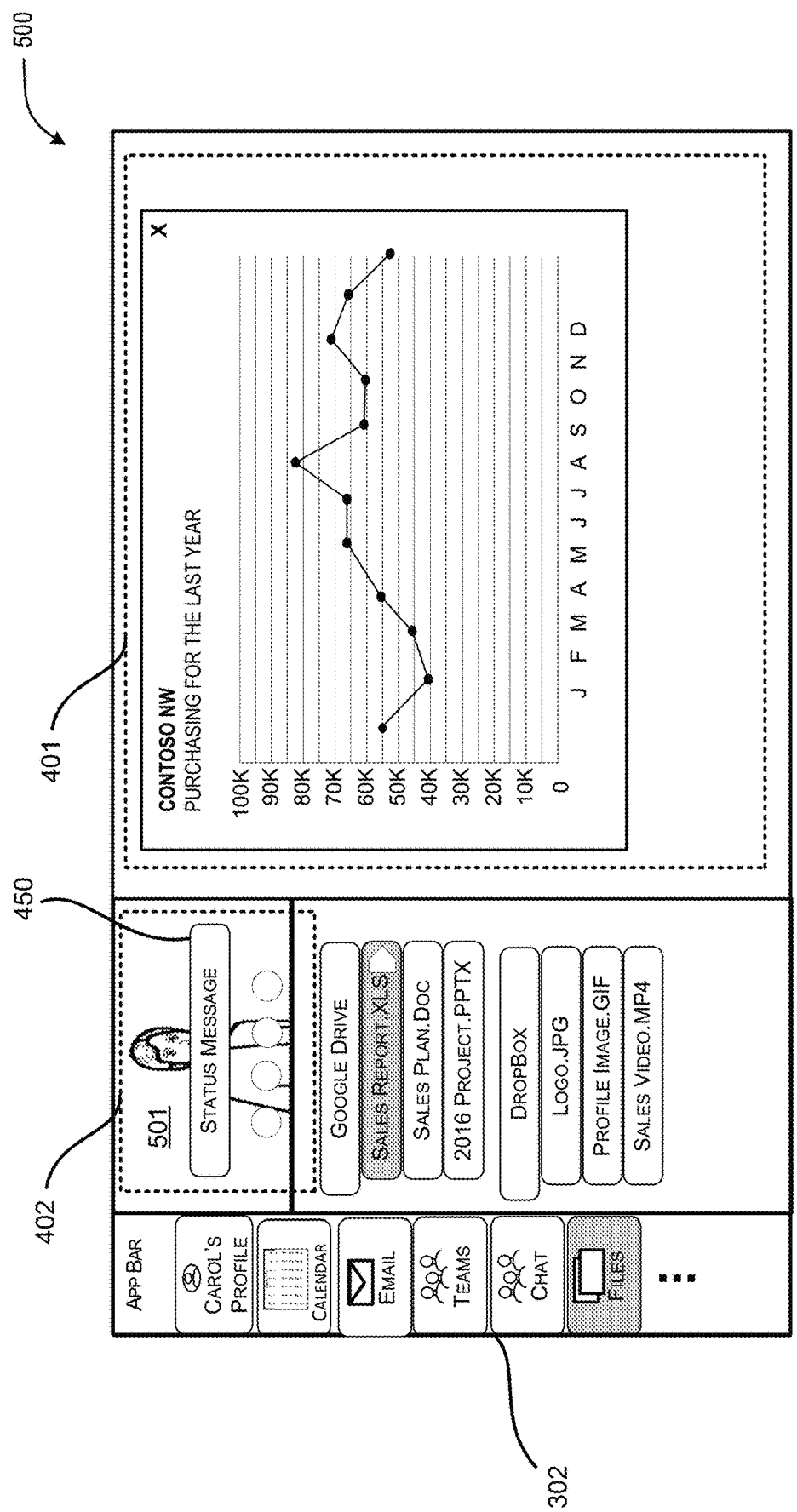

As shown in FIG. 5H, in response to a selection of an individual file, the contents of the selected file can be displayed in the first display area 401 of the graphical user interface 400. As shown, the contents of the selected file can be displayed in conjunction with one or more streams 501 that are selected based on an activity level. In all examples, the streams selected based on an activity level can involve content and/or people.

Figure 5I:
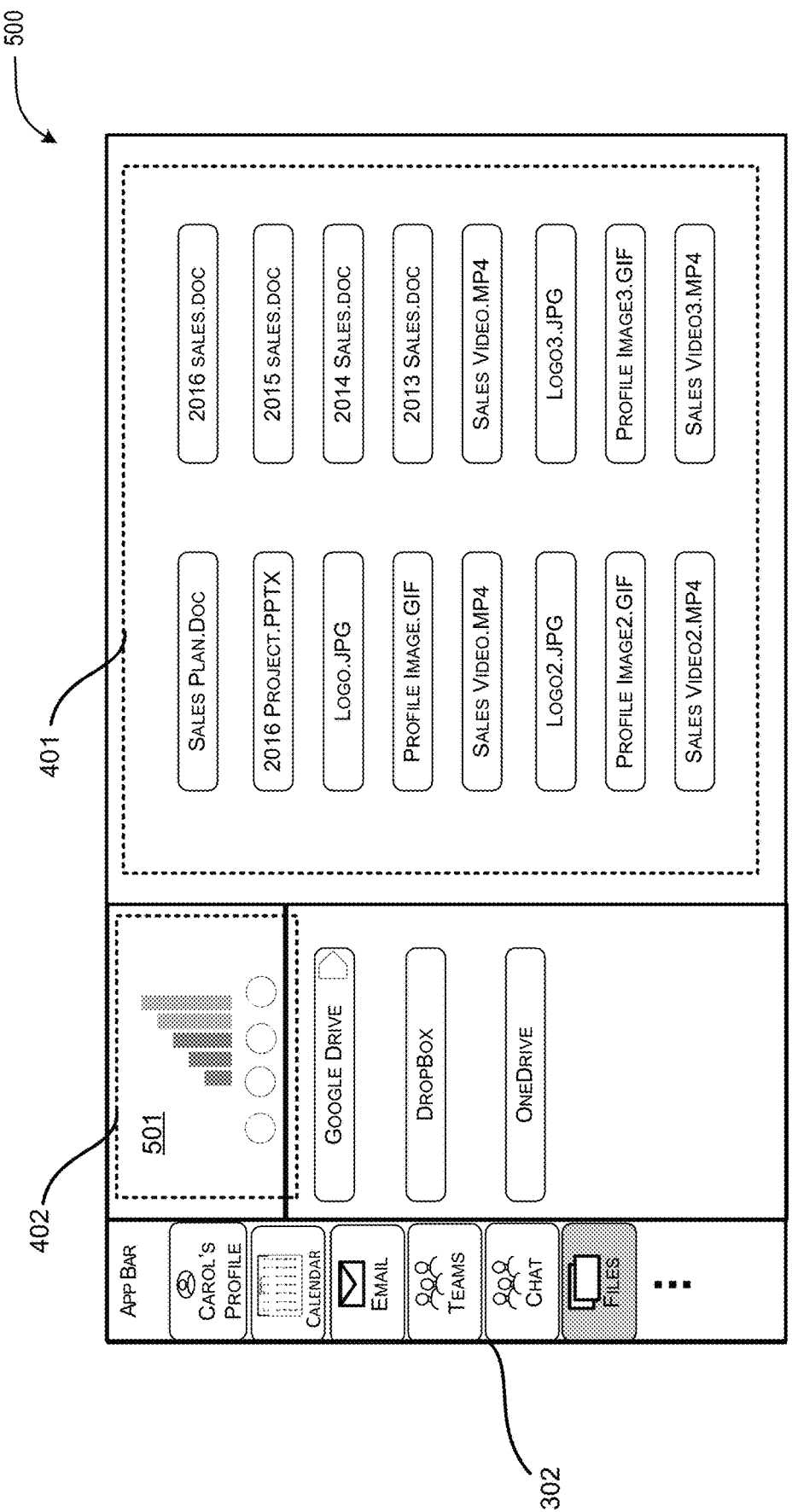
Figure 5J:
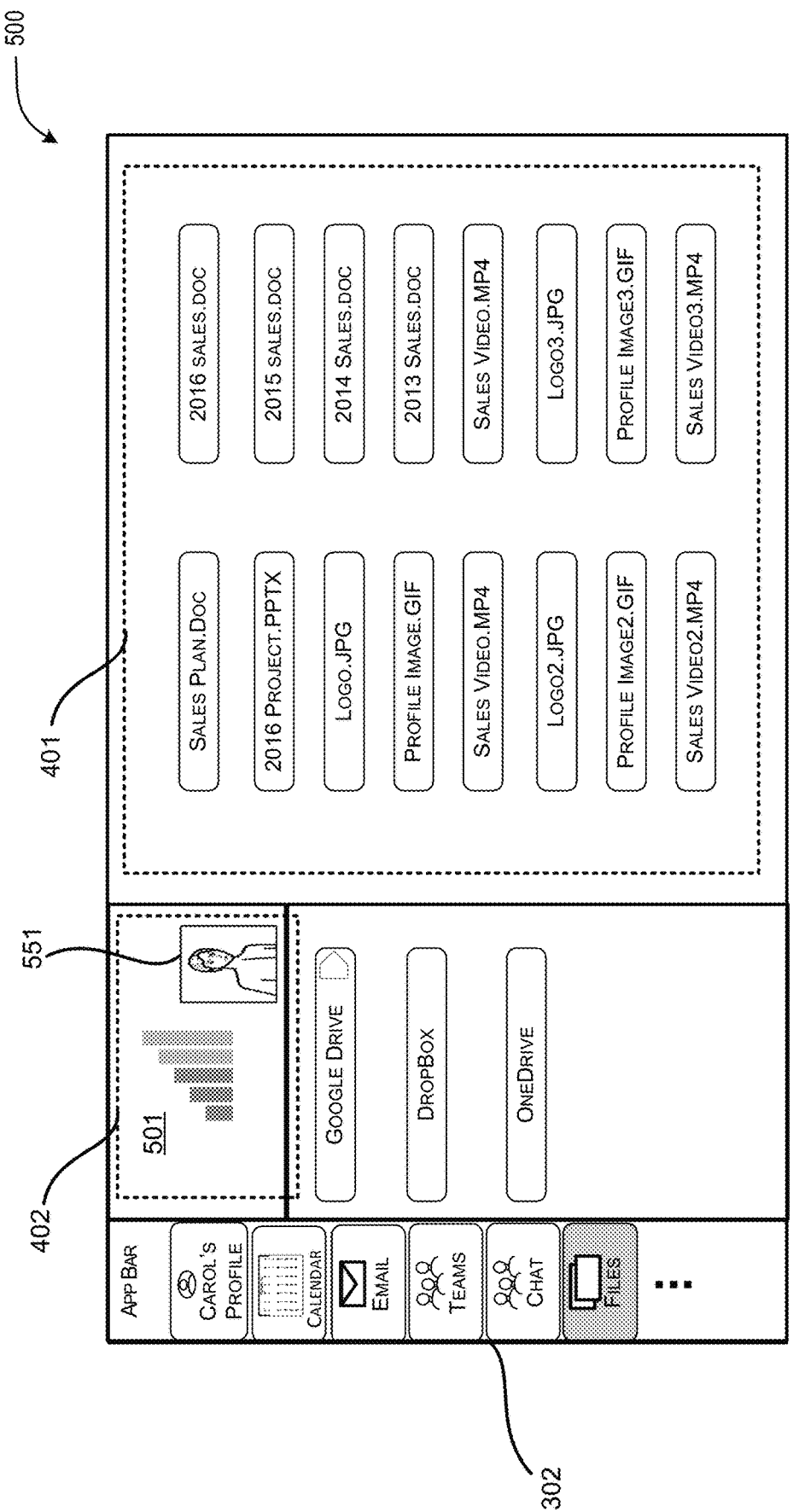

FIG. 5I illustrates an example user interface 500 that is displayed when the device 106 receives an actuation of the "File" interface element, 307F on FIG. 3C, of the app bar. In response to the selection, the device 106 retrieves a list of files from one or more program modules 132, and displays the list of files in the same user interface 400 as the streams 501 that are selected based on an activity level. In this example, the second display area 402 illustrates a rendering of shared content, such as a presentation file. In some embodiments, when user activity related to a particular stream reaches a particular threshold, such as a person talking for a predetermined period of time, the user interface 500 of FIG. 5I can transition to the user interface 500 shown in FIG. 5J, where an overlay view showing the active content 551 (people or content), can be displayed concurrently with the streams 501 shown in the second display area 402.

Figure 6:
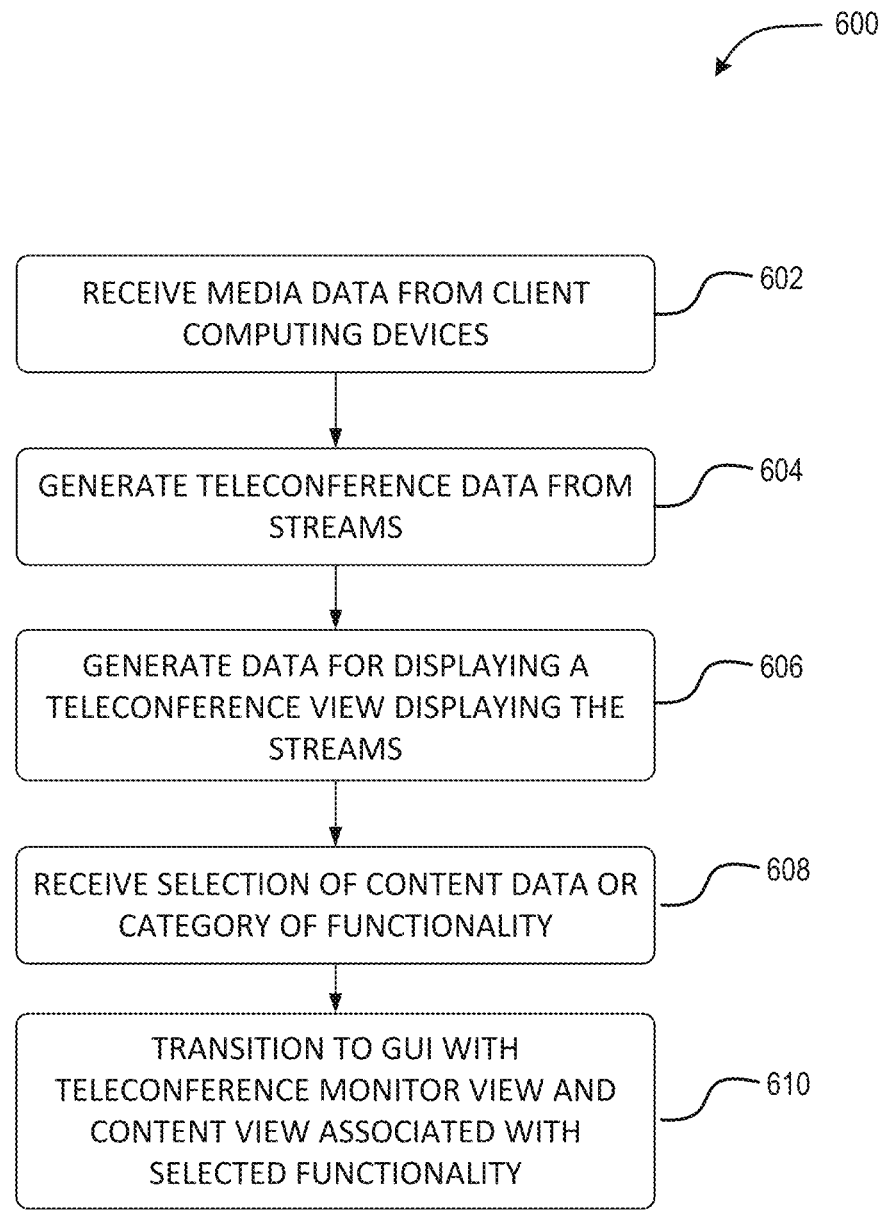
FIG. 6 is a flowchart illustrating an operation for presenting a teleconference monitor view with a multi-tasking view on a display of a client computing device.

Turning now to FIG. 6, aspects of a routine 600 for displaying the teleconference data on the display of a client computing device 106 are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 600 may be implemented by one or more of the elements associated with the system 100.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by an application, component and/or circuit, such as the server module 136 in the device 110 in FIG. 1 in the system 100 hosting the teleconference session 104. In some configurations, the server module 136 can be a dynamically linked library (DLL), a statically linked library, functionality produced by an application programing interface (API), a compiled program, an interpreted program, a script or any other executable set of instructions. Data and/or modules, such as the server module 136, can be stored in a data structure in one or more memory components. Data can be retrieved from the data structure by addressing links or references to the data structure.

Although the following illustration may refer to the components of FIG. 1 and FIG. 2, it can be appreciated that the operations of the routine 600 may also be implemented in many other ways. For example, the routine 600 may be implemented, at least in part, or in modified form, by a processor of another remote computer or a local circuit, such as for example, the client module 130 in the client computing device 106(1). In addition, one or more of the operations of the routine 600 may alternatively or additionally be implemented, at least in part, by a chipset working alone or in conjunction with other software modules. Any service, circuit or application suitable for providing the techniques disclosed herein can be used in operations described herein.

Referring to FIG. 6, the routine 600 begins at block 602, where the server module 136 receives a plurality of streams 142(1)-142(M) from corresponding client computing devices 106(1)-106(N). Users of each client computing device 106(1)-106(N) communicate a request to join the teleconference session 104 and communicate a stream 142 once authorized to participate in the teleconference session 104. The server module 136 receives the streams 142 from each client computing device 106(1)-106(N).

At block 604, portions of the streams are combined to generate teleconference data 146 corresponding to a selected client computing device 106(1) having a display device 150(1). In some configurations, step 604 can involve an operation where a server and/or client computer can analyze the teleconference data or the media streams to determine the presence of a content stream. For instance, the server can determine when a client computing device is sharing content data, such as a file, an image of an application, an application share screen, or any other type of content. Based on determining when content is part of the teleconference data or is not part of the teleconference data, one or more select streams of the content can be displayed on one or more client computing devices 106.

At block 606, the teleconference data is configured to display in a first user interface arrangement 300, which may correspond to the examples of FIGS. 3A-3C. For instance, the system can display a video of a session participant or a representation of a session participant, such as an avatar or icon. The system can also display a rendering of the at least one stream sharing content, such as a shared file or desktop, both of which are displayed through a teleconference session view. The first user interface arrangement 300 can also display a menu comprising a plurality of selectable elements, wherein individual elements of the plurality of selectable elements are associated with content data having a number of predetermined data types. The individual elements of the plurality of selectable elements can also be associated with individual categories of functionality. For example, individual selectable elements can invoke execution of a module for performing an editing function, a chat function, an email function, a calendar function, a file navigation function, or any other function suitable for editing or otherwise processing a file of a particular data type.

At block 608, the system can receive a selection of content data having a data type of a plurality of predetermined data types. For instance, a user can select the "chat" menu option in the App Bar 305, where the selected content data comprises chat data having a suitable data type. The selection of content data can include any suitable form of input, which may include a voice input, a touch-screen gesture input or any other form of input indicating a selection of content data having a predetermined data type. In other examples, the user may select other content data having other data types, such as a presentation file (PPTX, Keynote), spreadsheet file (XLSX, Numbers), etc. In block 608, the system can also receive a selection of a category of functionality. As described herein each category of functionality can include, but is not limited to, a document editing function, a chat function, an email function, a calendar function, a file navigation function, etc.

Next, at block 610, in response to receiving the selection of the content data of a particular data type and/or the selection of the category of functionality, the system can transition from the first graphical user interface arrangement 300 to a second graphical user interface arrangement (400 or 500) having a first display area 401 and a second display area 402. Examples of second graphical user interface arrangements (400 or 500) are in shown in FIG. 4A through FIG. 5H.

Also, in response to receiving the selection of the content data and/or a program having the category of functionality, the system can select one or more program modules 132 configured to process or edit the content data having the selected data type. For example, if the selected content data comprises chat data, the system can select a chat program for providing the functionality for a user to retrieve, interact, edit and otherwise process such content data. In the other above-referenced example, if the selected content data comprises presentation data, the system can select a presentation module, such as a PowerPoint module, for providing the functionality for a user to retrieve, interact, edit and otherwise process such content data. The system can then display renderings of the selected content data within the first display area 401 of the second graphical user interface, and the system can concurrently display the rendering of the at least one video stream within the second display area 402 of the second graphical user interface arrangement.

In some configurations, the stream that is rendered in the second graphical user interface can be selected based on activity level. Thus, in some configurations, the stream that is rendered in the second graphical user interface can be a video stream of an active participant or active content. The selected stream can accommodate the display area of the first graphical user interface, which may be smaller than the display area for the stream in the first graphical user interface, e.g., the teleconference session view.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

The present disclosure is made in light of the following examples:

Example 1

A system, comprising: one or more processing units; and a computer-readable medium having encoded thereon computer-executable instructions to cause the one or more processing units to display a rendering of at least one video stream of a teleconference session within a first graphical user interface arrangement rendered on a display device; display a menu comprising a plurality of selectable elements, wherein individual elements of the plurality of selectable elements are associated with content data having a number of data types; receive a selection of content data of at least one data type of the number of data types; in response to receiving the selection of the content data of the at least one data type, cause the system to transition from the first graphical user interface arrangement to a second graphical user interface arrangement having a first display area and a second display area, execute one or more program modules configured to edit the content data of the at least one data type, and cause the system to display renderings of the content data of the at least one data type within the first display area and the rendering of the at least one video stream within the second display area.

Example 2

The system of any of the above Examples, wherein the selection of the content data comprises a selection of channel communication content, and the channel communication content is displayed within the first display area of the second graphical user interface arrangement in conjunction with the display of the rendering of the at least one video stream within the second display area.

Example 3

The system of any of the above Examples, wherein the selection of the content data comprises a selection of chat communication content, and the chat communication content is displayed within the first display area of the second graphical user interface arrangement in conjunction with the display of the rendering of the at least one video stream within the second display area.

Example 4

The system of any of the above Examples, wherein the display of the rendering of the at least one video stream within the second display area of the second graphical user interface arrangement comprises graphical elements for providing core controls for the teleconference session, the core controls comprising at least a first control for controlling a microphone of the system, a second control for controlling a speaker of the system, and a third control for exiting the teleconference session.

Example 5

The system of any of the above Examples, wherein the instructions further cause the one or more processing units to: receive a status message indicating a status of the teleconference session; and display a graphical element comprising at least a portion of the status message within the second display area of the second graphical user interface arrangement.

Example 6

The system of any of the above Examples, wherein the status message indicates a quality of connection for the teleconference session.

Example 7

The system of any of the above Examples, wherein the first graphical user interface arrangement is configured to display the video streams in an edge-to-edge format, and wherein the second display area of the second graphical user interface arrangement is at a reduced size relative to the edge-to-edge format.

Example 8

The system of any of the above Examples, wherein the instructions further cause the one or more processing units to receive input data indicating a selection of an object of the content data, wherein the input data further indicates a gesture to share the object with one or more participants of the teleconference session; retrieve the object of the content data from a storage device; and communicate the object of the content data to one or more computing devices associated with the one or more participants of the teleconference session.

Example 9

A system, comprising: one or more processing units; and a computer-readable medium having encoded thereon computer-executable instructions to cause the one or more processing units to receive at least one video stream of a teleconference session; display a rendering of the at least one video stream within a first graphical user interface arrangement rendered on a display device; select content data, the content data comprising at least one of channel communication data, chat communication data, image data, video data, or documents data; in response to receiving the selection of the content data, cause the system to transition from the first graphical user interface arrangement to a second graphical user interface arrangement having a first display area and a second display area, retrieve the content data for one or more program modules configured to manage the content data, cause the system to display renderings of the content data, wherein the content data is displayed within the first display area of the second graphical user interface arrangement, and display the rendering of the at least one video stream within the second display area of the second graphical user interface arrangement.

Example 10

The system of any of the above Examples, wherein the selection of the content data comprises a selection of channel communication content, and the channel communication content is displayed within the first display area of the second graphical user interface arrangement in conjunction with the display of the rendering of the at least one video stream within the second display area.

Example 11

The system of any of the above Examples, wherein the selection of the content data comprises a selection of chat communication content, and the chat communication content is displayed within the first display area of the second graphical user interface arrangement in conjunction with the display of the rendering of the at least one video stream within the second display area.

Example 12

The system of any of the above Examples, wherein the display of the rendering of the at least one video stream within the second display area of the second graphical user interface arrangement comprises graphical elements for providing core controls for the teleconference session, the core controls comprising at least a first control for controlling a microphone of the system, a second control for controlling a speaker of the system, and a third control for exiting the teleconference session.

Example 13

The system of any of the above Examples, wherein the instructions further cause the one or more processing units to: receive a status message indicating a status of the teleconference session; and display a graphical element comprising at least a portion of the status message within the second display area of the second graphical user interface arrangement.

Example 14

The system of any of the above Examples, wherein the status message indicates a quality of connection for the teleconference session.

Example 15

The system of any of the above Examples, wherein the second display of the second graphical user interface arrangement is at a reduced size relative to the second display of the first graphical user interface arrangement.

Example 16

The system of any of the above Examples, wherein the instructions further cause the one or more processing units to: receive input data indicating a selection of an object of the content data, wherein the input data further indicates a gesture to share the object with one or more participants of the teleconference session; retrieve the object of the content data from a storage device; and communicate the object of the content data to one or more computing devices associated with the one or more participants of the teleconference session.

Example 17

A system, comprising: one or more processing units; and a computer-readable medium having encoded thereon computer-executable instructions to cause the one or more processing units to receive at least one video stream of a teleconference session; display a rendering of the at least one video stream within a first graphical user interface arrangement rendered on a display device; receive a selection of content data having a data type of a plurality of predetermined data types; in response to receiving the selection of the content data, cause the system to transition from the first graphical user interface arrangement to a second graphical user interface arrangement having a first display area and a second display area, select one or more program modules configured to manage the content data having the data type, retrieve the content data for the one or more program modules configured to manage the content data having the data type, cause the system to display renderings of the content data, wherein the content data is displayed within the first display area of the second graphical user interface arrangement, and cause the system to display the rendering of the at least one video stream within the second display area of the second graphical user interface arrangement.

Example 18

The system of any of the above Examples, wherein the selection of the content data comprises a selection of channel communication content, and the channel communication content is displayed within the first display area of the second graphical user interface arrangement in conjunction with the display of the rendering of the at least one video stream within the second display area.

Example 19

The system of any of the above Examples, wherein the selection of the content data comprises a selection of chat communication content, and the chat communication content is displayed within the first display area of the second graphical user interface arrangement in conjunction with the display of the rendering of the at least one video stream within the second display area.

Example 20

The system of any of the above Examples, wherein the display of the rendering of the at least one video stream within the second display area of the second graphical user interface arrangement comprises graphical elements for providing core controls for the teleconference session, the core controls comprising at least a first control for controlling a microphone of the system, a second control for controlling a speaker of the system, and a third control for exiting the teleconference session.

Example 21

The system of any of the above Examples, wherein the instructions further cause the one or more processing units to: receive a status message indicating a status of the teleconference session; and display a graphical element comprising at least a portion of the status message within the second display area of the second graphical user interface arrangement.

Example 22

The system of any of the above Examples, wherein the status message indicates a quality of connection for the teleconference session.

Example 23

The system of any of the above Examples, wherein the second display of the second graphical user interface arrangement is at a reduced size relative to the second display of the first graphical user interface arrangement.

Example 24

The system of any of the above Examples, wherein the instructions further cause the one or more processing units to: receive input data indicating a selection of an object of the content data, wherein the input data further indicates a gesture to share the object with one or more participants of the teleconference session; retrieve the object of the content data from a storage device; and communicate the object of the content data to one or more computing devices associated with the one or more participants of the teleconference session.

Example 25

A system, comprising: one or more processing units; and a computer-readable medium having encoded thereon computer-executable instructions to cause the one or more processing units to communicate teleconference data to a computing device causing the computing device to display a rendering of a plurality of streams of a teleconference session within a first graphical user interface arrangement rendered on a display device; selecting one or more streams of the plurality of streams based on an activity level associated with the one or more streams; receive a selection of a program module for performing a category of functionality on content data; in response to receiving the selection of the program module, cause the computing device to transition from the first graphical user interface arrangement to a second graphical user interface arrangement having a first display area and a second display area, and cause the computing device to display renderings of the content data within the first display area and the rendering of the one or more streams within the second display area.

Example 26

The system of any of the above Examples, wherein the one or more streams comprises a participant or content, wherein the one or more streams is selected based the activity level of at least one of: participant motion, participant lip motion, participant facial expressions, content modification, page turning activity of the content, a number of participants of the teleconference session having the content displayed, the participant entering the teleconference session, or the participant leaving the teleconference session.

Example 27

The system of any of the above Examples, wherein the program module comprises at least one of a word processing program, a spreadsheet program, a presentation program, a chat program, a messaging program, or a file sharing program.

Example 28

The system of any of the above Examples, wherein the first graphical user interface arrangement comprises a menu of program modules, wherein the menu of program modules comprises at least two or more of a word processing program, a spreadsheet program, a presentation program, a chat program, a messaging program, or a file sharing program.

Example 29

The system of any of the above Examples, wherein the second graphical user interface arrangement displays a number of graphical elements, wherein each graphical element represents an individual file of a plurality of files, wherein the instructions further cause the one or more processing units to: receive a selection of a file from the plurality of files; receive an input command indicating a gesture to move the file from the first display area comprising the graphical elements to the second display area; and in response to the input command, sharing the file with computing devices associated with users participating in the teleconference session.

Example 30

A system, comprising: one or more processing units; and a computer-readable medium having encoded thereon computer-executable instructions to cause the one or more processing units to receive teleconference data causing a display device in communication with the system to display a rendering of a plurality of streams of a teleconference session within a first graphical user interface arrangement rendered on a display device; selecting one or more streams of the plurality of streams based on an activity level associated with the one or more streams; receive a selection of a program module for performing a category of functionality on content data; in response to receiving the selection of the program module, cause the display device to transition from the first graphical user interface arrangement to a second graphical user interface arrangement having a first display area and a second display area, and cause the display device to display renderings of the content data within the first display area and the rendering of the one or more streams within the second display area.

Example 31

The system of any of the above Examples, wherein the one or more streams comprises a participant or content, wherein the one or more streams is selected based the activity level of at least one of: participant motion, participant lip motion, participant facial expressions, content modification, page turning activity of the content, a number of participants of the teleconference session having the content displayed, the participant entering the teleconference session, or the participant leaving the teleconference session.

Example 32

The system of any of the above Examples, wherein the program module comprises at least one of a word processing program, a spreadsheet program, a presentation program, a chat program, a messaging program, or a file sharing program.

Example 33

The system of any of the above Examples, wherein the first graphical user interface arrangement comprises a menu of program modules, wherein the menu of program modules comprises at least two or more of a word processing program, a spreadsheet program, a presentation program, a chat program, a messaging program, or a file sharing program.

Example 34

The system of any of the above Examples, wherein the second graphical user interface arrangement displays a number of graphical elements, wherein each graphical element represents an individual file of a plurality of files, wherein the instructions further cause the one or more processing units to: receive a selection of a file from the plurality of files; receive an input command indicating a gesture to move the file from the first display area comprising the graphical elements to the second display area; and in response to the input command, sharing the file with computing devices associated with users participating in the teleconference session.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system, comprising:
one or more processing units; and
a computer-readable medium having encoded thereon computer-executable instructions to cause the one or more processing units to:
cause a display of a first display area of a first user interface arrangement comprising a rendering of a select user with a first number of video streams depicting other remote users of a communication session within the first user interface arrangement rendered on a display device;
cause a display of a menu comprising a plurality of selectable elements, wherein individual elements of the plurality of selectable elements are configured to provide access to functionality for editing content data from a computing device causing a display of the first user interface arrangement;
receive a selection of a selectable element from the menu, wherein the selection is configured to change the number of displayed video streams depicting the other remote users of the communication session while maintaining the display of the select user to allocate a portion of a display area for a display of the content data;
in response to the selection of the selectable element, cause a change in the number of displayed video streams depicting the other remote users of the communication session while maintaining the display of the select user thereby allocating the portion of a display area for a display of the content data;
cause a transition from the first user interface arrangement to a second user interface arrangement having a first display area of the second user interface arrangement comprising interface elements for editing the content data and a second display area comprising a rendering of a second number of video streams depicting the other remote users at a second position, wherein the first number of video streams depicting the other remote users is different than the second number of video streams depicting the other remote users;
cause an execution of one or more program modules configured to edit the content data; and
cause a display of the second user interface arrangement having the first display area comprising the interface elements for editing the content data concurrently with the rendering of a second number of video streams depicting the other remote users at a second position concurrently with the display of the select user within the second display area on the display device of the computing device that received the selection of content data.

2. The system of claim 1, wherein the communication session is associated with a first category of functionality and wherein causing the execution of the one or more program modules configured to edit the content data comprises activating a second category of functionality that is different than the first category of functionality of the communication session.

3. The system of claim 1, wherein editing the content data is enabled by an invitation to edit the content data.

4. The system of claim 1, wherein the second display area of the second user interface arrangement comprises a rendering of second content data displayed concurrently with the second number of video streams at the second position and wherein the first display area comprises interface elements for selecting a file.

5. The system of claim 1, wherein the computer-executable instructions further cause the one or more processing units to: determine the select user depicted in the rendering that is maintained during the transition from the first user interface arrangement to the second user interface arrangement, where the transition changes the number of displayed video streams depicting the other remote users to allocate the portion of the display area for the display of the content data, wherein the select user is determined to be maintained during the transition in response to determining that the select user has talked for a predetermined period of time.

6. The system of claim 1, wherein the computer-executable instructions further cause the one or more processing units to: determine the select user depicted in the rendering that is maintained during the transition from the first user interface arrangement to the second user interface arrangement, where the transition changes the number of displayed video streams depicting the other remote users to allocate the portion of the display area for the display of the content data, wherein the select user is determined to be maintained during the transition in response to determining that the select user is in the process of gesturing or moving.

7. The system of claim 1, wherein the computer-executable instructions further cause the one or more processing units to: determine the select user depicted in the rendering that is maintained during the transition from the first user interface arrangement to the second user interface arrangement, where the transition changes the number of displayed video streams depicting the other remote users to allocate the portion of the display area for the display of the content data, wherein the select user is determined to be maintained during the transition in response to determining that the lips of the select user are moving as an indication of an extent to which the select user is speaking.

8. The system of claim 1, wherein the computer-executable instructions further cause the one or more processing units to: determine the select user depicted in the rendering that is maintained during the transition from the first user interface arrangement to the second user interface arrangement, where the transition changes the number of displayed video streams depicting the other remote users to allocate the portion of the display area for the display of the content data, wherein the select user is determined to maintained during the transition in response to determining that the select user has modified the content data.

9. The system of claim 1, wherein the computer-executable instructions further cause the one or more processing units to: determine the select user depicted in the rendering that is maintained during the transition from the first user interface arrangement to the second user interface arrangement, where the transition changes the number of displayed video streams depicting the other remote users to allocate the portion of the display area for the display of the content data, wherein the select user is determined to maintained during the transition in response to determining that the select user has modified a display of a page of the content data.

10. A system, comprising:
one or more processing units; and
a computer-readable medium having encoded thereon computer-executable instructions to cause the one or more processing units to:
receive at least one video stream of a communication session;
cause a display of a first display area of a first user interface arrangement rendering of a select user with a first number of video streams depicting other remote users of a communication session;
receive a selection of a selectable element from a menu comprising a plurality of selectable elements, wherein individual elements of the plurality of selectable elements are configured to provide access to functionality for editing content data, the selection received from a computing device associated with the display device displaying the first user interface arrangement, the content data comprising at least one of channel communication data, chat communication data, or documents data, wherein an input indicating the selection of the content data is configured to change the number of displayed video streams depicting the other remote users of the communication session while maintaining the display of the select user thereby allocating the portion of the display area for a display of the content data;
in response to the selection of the selectable element, cause a change in the number of displayed video streams depicting the other remote users of the communication session while maintaining the display of the select user thereby allocating the portion of the display area for a display of the content data, and cause a selection of a video stream depicting the select user from the at least one video stream based on an activity level associated with a participant of the video stream,
cause a transition from the first user interface arrangement to a second user interface arrangement having a first display area comprising interface elements for selecting a file and a second display area comprising a rendering of a second number of video streams depicting the other remote users at a second position, wherein the first number of video streams depicting the other remote users is different than the second number of video streams depicting the other remote users, and
cause a display of the rendering of the video stream depicting the select user within the second display area of the second graphical user interface arrangement concurrently with the content data displayed within the first display area of the second graphical user interface arrangement on the display device of the computing device that received the selection of content data.

11. The system of claim 10, wherein the selection of the content data comprises a selection of chat communication content, and the chat communication content is displayed within the second display area of the second graphical user interface arrangement in conjunction with the display of the rendering of the video stream within the first display area.

12. The system of claim 10, wherein the instructions further cause the one or more processing units to:
receive a status message indicating a status of the communication session; and
display a graphical element comprising at least a portion of the status message within the second display area of the second graphical user interface arrangement.

13. The system of claim 12, wherein the status message indicates a quality of connection for the communication session.

14. The system of claim 10, wherein the instructions further cause the one or more processing units to:
receive input data indicating a selection of an object of the content data, wherein the input data further indicates a gesture to share the object with one or more participants of the communication session;

retrieve the object of the content data from a storage device; and communicate the object of the content data to one or more computing devices associated with the one or more participants of the communication session.

15. A system, comprising:

one or more processing units; and a computer-readable medium having encoded thereon computer-executable instructions to cause the one or more processing units to:

communicate communication data to a computing device causing the computing device to display a first display area of a first user interface arrangement comprising a rendering of a select user with a first number of video streams depicting other remote users of a communication session;

receive a selection of a selectable element from a menu comprising a plurality of selectable elements, wherein individual elements of the plurality of selectable elements are configured to provide access to functionality for editing content data, the selection received from a computing device associated with the display device displaying the first user interface arrangement;

in response to selection of the selectable element, cause a selection of a video stream depicting the select user from the plurality of video streams based on an activity level associated with the select user, the selection for invoking the category of functionality further causing a change in the number of displayed video streams depicting the other remote users of the communication session while maintaining the display of the select user thereby allocating a portion of a display area for a display of the content data, cause a transition from the first user interface arrangement to a second user interface arrangement having a first display area of the second user interface arrangement of the video stream of the select user that is moved to a second position and a second display area comprising interface elements for editing the content data utilizing the selected program module, and cause a display of renderings of the content data within the second display area concurrently with a rendering of the changed number of displayed video streams that is concurrently rendered with the video stream depicting the select user of the second graphical user interface arrangement on the display device of the computing device that received the selection of content data.

16. The system of claim 15, wherein the program module comprises at least one of a word processing program, a spreadsheet program, a presentation program, a chat program, a messaging program, or a file sharing program.

17. The system of claim 15, wherein the first graphical user interface arrangement comprises a menu of program modules, wherein the menu of program modules comprises at least two or more of a word processing program, a spreadsheet program, a presentation program, a chat program, a messaging program, or a file sharing program.

18. The system of claim 15, wherein the second graphical user interface arrangement displays a number of graphical elements, wherein each graphical element represents an individual file of a plurality of files, wherein the instructions further cause the one or more processing units to:

receive a selection of a file from the plurality of files;

receive an input command indicating a gesture to move the file from the first display area comprising the graphical elements to the second display area; and in response to the input command, share the file with computing devices associated with users participating in the communication session.

* * * * *